(12) United States Patent
Aonuma

(10) Patent No.: US 6,939,575 B2
(45) Date of Patent: Sep. 6, 2005

(54) FERROMAGNETIC METAL POWDER, PRODUCING METHOD OF THE SAME, AND MAGNETIC RECORDING MEDIUM

(75) Inventor: Masashi Aonuma, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 202 days.

(21) Appl. No.: 10/267,790

(22) Filed: Oct. 10, 2002

(65) Prior Publication Data

US 2003/0129402 A1 Jul. 10, 2003

(30) Foreign Application Priority Data

Oct. 12, 2001 (JP) .................................... P. 2001-315366

(51) Int. Cl.$^7$ .................................................. B32B 5/16
(52) U.S. Cl. ...................................... 427/127; 427/215
(58) Field of Search ................................ 427/127, 215; 428/403, 143, 144, 148, 329, 694 BA, 694 BR

(56) References Cited

U.S. PATENT DOCUMENTS

| | | | | |
|---|---|---|---|---|
| 3,958,068 A | * | 5/1976 | Umeki et al. ................ 428/403 |
| 4,125,474 A | * | 11/1978 | Dezawa et al. ........... 252/62.62 |
| 4,155,748 A | * | 5/1979 | Steck et al. .................... 75/349 |
| 4,253,886 A | * | 3/1981 | Aonuma et al. ............. 148/105 |
| 4,431,712 A | * | 2/1984 | Matsufuji et al. ............ 428/692 |
| 4,475,946 A | * | 10/1984 | Matsufuji et al. ............ 428/405 |
| 4,604,296 A | * | 8/1986 | Aonuma et al. ............. 427/565 |
| 5,399,278 A | * | 3/1995 | Yamashita et al. ........ 252/62.56 |
| 5,512,194 A | * | 4/1996 | Ogasawara et al. ....... 252/62.56 |
| 5,580,399 A | | 12/1996 | Tamai et al. |
| 5,735,969 A | * | 4/1998 | Lown et al. ................. 148/105 |
| 5,770,302 A | | 6/1998 | Masaki |
| 6,149,989 A | * | 11/2000 | Araki et al. ........... 428/694 BL |
| 6,607,807 B2 | * | 8/2003 | Zinbo et al. ................. 428/141 |
| 6,638,599 B2 | * | 10/2003 | Masaki et al. ............... 428/141 |
| 6,689,455 B2 | * | 2/2004 | Masaki ........................ 428/329 |
| 6,753,084 B2 | * | 6/2004 | Maekawa et al. ............ 428/402 |

FOREIGN PATENT DOCUMENTS

JP 6-68829 8/1994

* cited by examiner

Primary Examiner—H. Thi Le
(74) Attorney, Agent, or Firm—Sughrue Mion, PLLC

(57) ABSTRACT

A ferromagnetic metal powder having an average long axis length of from 30 to 65 nm, a crystallite size of from 80 to 130 angstroms, a saturation magnetization ($\sigma$s) of from 75 to 130 A·m$^2$/kg, and an average oxide layer thickness of from 1.5 to 2.5 nm; a method of producing a ferromagnetic metal powder comprising: reducing the oxide of a ferromagnetic metal element to obtain the ferromagnetic metal powder, subjecting the ferromagnetic metal powder to gradual oxidation treatment to make as 120 to 150 A·m$^2$/kg, adhering at least one element selected from Al, Y, lanthanoid, Zr and W to the ferromagnetic metal powder in water, performing heat treatment, and again performing gradual oxidation treatment; and a magnetic recording medium comprising a support having provided thereon a magnetic layer mainly comprising a ferromagnetic metal powder and a binder, wherein the magnetic layer containing the ferromagnetic metal powder has a thickness of from 0.04 to 0.25 $\mu$m, and demagnetization after storage at 60° C. 90% RH for one week of 10% or less.

6 Claims, No Drawings

FERROMAGNETIC METAL POWDER, PRODUCING METHOD OF THE SAME, AND MAGNETIC RECORDING MEDIUM

FIELD OF THE INVENTION

The present invention relates to a magnetic recording medium, such as a magnetic tape and a magnetic disc, specifically relates to a coating type magnetic recording medium (i.e., a magnetic recording particulate medium) comprising a nonmagnetic support having coated thereon a magnetic coating solution mainly comprising a ferromagnetic metal powder and a binder to form a magnetic layer, which is excellent in low noise in a short wavelength region, output, C/N, overwriting characteristics, resistance to demagnetization due to storage under high temperature and high humidity conditions, further excellent in durability, still and friction coefficient. The present invention particularly relates to a magnetic recording medium excellent in low noise which is suitable for a magneto-resistance type (MR) head, high output, running durability, and resistance to demagnetization due to storage under high temperature and high humidity conditions.

BACKGROUND OF THE INVENTION

Magnetic recording techniques have been widely used in various fields including video, audio and computer uses, since magnetic recording techniques have characteristics which are not found in other recording systems, such that a recording medium can be used repeatedly, signals can be easily electronized and a system by combination with peripheral equipments can be constructed, and signals can be easily modified.

And further improvements of recording density, reliability and durability of the magnetic recording medium have always been desired to respond to requirements, such as the miniaturization of apparatus, the improvement of the quality of recording and reproducing signals, long time recording, and the increase of recording capacity.

In recent years, in the magnetic recording and reproducing system for recording and reproducing computer data, a system into which a thin film magnetic head is incorporated has been put to practical use. Since thin film magnetic heads are easy to be miniaturized or processed to multitrack heads, multitrack fixed heads of thin film magnetic heads are largely used in systems using magnetic tapes as recording media. By the use of thin film magnetic heads, improvements of track density and recording efficiency are realized by virtue of the miniaturization, which lead to the realization of high density recording, as well as the improvement of data transfer speed by the realization of multitrack. Thin film magnetic heads can be classified broadly into two categories of an induction type head of responding to time variation of flux of magnetic induction, and a magneto-resistance type (MR) head utilizing a magneto-resistance effect responding to the size of magnetic flux. Since an induction type head is of planar structure, the number of winding of coil is less, hence it is difficult to make magnetomotive force high, so that sufficient reproduction output cannot be obtained. Therefore, an MR head capable of easily obtaining high reproduction output is used for reproduction, on the other hand, an induction type head is used for recording. These magnetic heads are generally incorporated into a system as integral. In such a magnetic recording system, a linear recording method capable of realizing higher data transfer speed is adopted.

On the other hand, the development of a rotating drum-mounting MR head suitable for a helical scan system tape recording apparatus is being advanced for realizing tape recording of a high transfer speed of high capacity magnetic data with a small-sized cassette. In audio and video uses, to put to practical use a digital recording system capable of realizing the improvement of sound and image qualities, and to answer to the development of a picture recording system corresponding to high vision TV, a demand has been increased for a magnetic recording medium which can record and reproduce further shorter wavelength signals than conventional systems and reliability and durability are secured even if the relative speed of a head and a medium becomes large.

For increasing the recording density of a coating type magnetic recording medium, a variety of methods have been discussed and suggested from the viewpoints of, e.g., by use of iron or a magnetic alloy powder comprising iron as a main component in place of conventionally used magnetic iron oxide powders, the improvement of magnetic powders such as fining of magnetic powders and the improvement of the packing density and the orientation property, improving the magnetic characteristics of a magnetic layer, improving the dispersibility of ferromagnetic powders, and improving the surface property of a magnetic layer.

For instance, methods of using ferromagnetic metal powders and hexagonal ferrite powders as ferromagnetic powders for increasing magnetic characteristics are disclosed in Japanese Patent (Application) Laid-Open Nos. 122623/1983, 74137/1986, Japanese Patent Publication Nos. 49656/1987, 50323/1985, U.S. Pat. Nos. 4,629,653, 4,666,770 and 4,543,198.

Japanese Patent Laid-Open No. 18961/1989 discloses a ferromagnetic powder having a specific surface area of from 30 to 55 $m^2/g$, a coercive force of 1,300 Oe or more, and a saturation magnetization (amount) of 120 emu/g or more produced from a magnetic metal powder having a long axis diameter of from 0.05 to 0.2 $\mu$m and an axis ratio of from 4 to 8, and suggests to provide fine metal powders having a small specific surface area. There are disclosed in Japanese Patent Laid-Open Nos. 11300/1985 and 21307/1985 producing methods of a fine $\alpha$-iron hydroxide acicular crystal suitable for a ferromagnetic powder, in particular, a ferromagnetic metal powder, and Japanese Patent Laid-Open No. 21307/1985 discloses that a ferromagnetic metal powder having a coercive force (Hc) of from 1,450 to 1,600 Oe, and a saturation magnetization ($\sigma$s) of from 142 to 155 emu/g can be produced from goethite having a long axis length of from 0.12 to 0.25 $\mu$m and an axis ratio of from 6 to 8. Japanese Patent Laid-Open No. 91684/1997 proposes to use ferromagnetic metal particles wherein ferromagnetic metal particles having an average long axis diameter of from 0.05 to 0.12 $\mu$m and an acicular ratio of 8 or more account for 5.0% or less of the entire ferromagnetic metal particles, or to use ferromagnetic metal particles wherein crystallites having an acicular ratio of 4 or more which constitute the particles account for 17.0% or less of the entire ferromagnetic metal particles. However, when particles having a small acicular ratio are mixed, a ferromagnetic powder having high Hc is difficult to obtain, and S/N and overwriting characteristics are insufficient.

Further, a hematite nucleic crystal, iron hydroxide, monodispersed hematite particles of a spindle configuration using specific ions, and an extremely fine ferromagnetic powder obtained by reducing the hematite particles are disclosed in Japanese Patent Laid-Open Nos. 340426/1994 and 109122/1995.

For increasing the dispersibility of a ferromagnetic powder, it is proposed to use various kinds of surfactants (e.g., in Japanese Patent Laid-Open Nos. 156606/1977, 15803/1978 and 116114/1978), and a variety of reactive coupling agents (in Japanese Patent Laid-Open Nos. 59608/1974, 58135/1981 and Japanese Patent Publication No. 28489/1987).

Further, Japanese Patent Laid-Open No. 239819/1989 proposes a magnetic powder obtained by adhering in order a boron compound, an aluminum compound, or an aluminum compound and a silicon compound on the particle surface of a magnetic iron oxide to improve magnetic characteristics and dispersibility of the magnetic powder. Further, Japanese Patent Laid-Open No. 22224/1995 discloses a ferromagnetic metal powder containing 0.05 mass % or less of the elements belonging to Group Ia of the Periodic Table and, if necessary, from 0.1 to 30 atomic % of aluminum based on the total amount of the metal elements, and from 0.1 to 10 atomic % of rare earth elements based on the total amount of the metal elements, and 0.1 mass % or less of residues of the elements belonging to Group IIa of the Periodic Table, to thereby obtain a high density magnetic recording medium excellent in storage stability and magnetic characteristics.

Moreover, for improving the surface property of a magnetic layer, a method of improving surface treating method of a magnetic layer after coating and drying is suggested (e.g., disclosed in Japanese Patent Publication No. 44725/1985).

On the other hand, for achieving high recording density of a magnetic recording medium, to make shortwave of signals to be used has been aggressively advanced. However, when the length of the region to record signals becomes the size comparable with the size of the magnetic material used, clear magnetization transition state cannot be formed, as a result recording becomes substantially unfeasible. For that reason, it is necessary to develop a magnetic material having sufficiently minute particle size relative to the minimum wavelength used, therefore, fining of a magnetic material has been pointed out for a long time.

In a metal powder for magnetic recording, an aimed coercive force is obtained by making a particle configuration acicular and providing configuration anisotropy. It is well known in the art that the surface roughness of the medium obtained by fining a ferromagnetic metal powder must be made small for high density recording. However, when a metal powder for magnetic recording is made fine, the acicular ratio of the metal powder reduces with fining and the desired coercive force cannot be obtained. In recent years, a DVC system of recording video signals by digitization has been suggested and a metal evaporation tape (an ME tape) of high performance and a metal powder (coating) tape (an MP tape) of high performance are used for that uses. Since the coercive force of MP tapes for use in DVC is 2,000 Oe or more, ferromagnetic metal powders are required to have a high coercive force, to be fine, and have excellent particle size distribution. Further, tapes are in many cases used in the form of recording methods of overwriting magnetic signals, they are desired to have good overwriting characteristics.

The present inventors have proposed a ferromagnetic metal powder suitable for a DVC system and a magnetic recording medium using the same (Japanese Patent Laid-Open No. 326035/1995). This invention is to provide a magnetic recording medium in which a magnetic layer is restrained to have a coercive force of from 2,000 to 3,000 Oe, a layer thickness of from 0.05 to 0.3 $\mu$m and surface roughness of from 1 to 3 nm, and the magnetic flux revolution factor is specified.

Further, as the magnetic recording medium for use in a magnetic recording system having incorporated thin film magnetic heads, a magnetic recording medium comprising a nonmagnetic support having provided thereon a lower nonmagnetic layer containing an inorganic nonmagnetic powder dispersed in a binder, and an upper magnetic layer containing a ferromagnetic metal powder dispersed in a binder on the nonmagnetic layer is proposed (Japanese Patent Laid-Open No. 227517/1996). Since output reduction due to thickness loss can be inhibited and high recording density can be achieved by thinning an upper magnetic layer as above, data storage of higher capacity becomes possible as compared with a magnetic recording medium having a magnetic layer of single layer structure. The patent discloses that the layer thickness of the upper magnetic layer is from 0.05 to 1.0 $\mu$m, preferably from 0.05 to 0.8 $\mu$m. Specifically, a magnetic recording medium for computer data recording comprising a polyethylene terephthalate support having a thickness of 10 $\mu$m having, on one side of the support in order, a nonmagnetic layer having a thickness of 2.7 $\mu$m and a magnetic layer having a thickness of 0.3 $\mu$m containing a ferromagnetic metal powder having a coercive force (Hc) of 1,800 Oe provided is disclosed.

In a magnetic recording system having incorporated MR heads, there are problems in the adaptability of the MR heads to the magnetic recording medium for use in the system.

That is, when a magnetic recording medium having a comparatively thick magnetic layer (0.3 $\mu$m) is used as the magnetic recording medium, since the magnetic flux of the magnetic layer becomes high, MR heads are saturated due to the overbalance of reproduction output, the reproduction waveform is deformed, as a result, a sufficiently high S/N value cannot be obtained, and an error rate is liable to increase. It was also found that recording and reproduction waveform (isolated reproduction revolution waveform) is generally preferably sharper (the half value width of the waveform is small) for achieving high recording density, however, in a magnetic recording medium having a relatively thick magnetic layer, the half value width of recording and reproduction waveform becomes great, so that sufficiently high recording density cannot be obtained.

On the other hand, when a magnetic recording medium having a very thin magnetic layer (0.03 $\mu$m) is used, the recording and reproduction waveform is deformed, as a result, a sufficiently high S/N value cannot be obtained similarly, and reproduction output itself is also liable to lower.

Further, an extremely fine ferromagnetic powder is necessary for the magnetic recording medium preferably used in a magnetic recording and reproducing system having incorporated MR magnetic heads capable of high density recording at high data transfer speed. However, the finer the powders, the more difficult is the production of ferromagnetic powders which satisfy both electromagnetic characteristics and storage stability (weather-fastness).

SUMMARY OF THE INVENTION

The objects of the present invention are to provide a ferromagnetic metal powder high in output, low in noise, and excellent in weather-fastness, a producing method of the same, and a magnetic recording medium.

The objects of the present invention are achieved by the following means:

(1) A ferromagnetic metal powder having an average long axis length of from 30 to 65 nm, a crystallite size of from 80 to 130 angstroms, a saturation magnetization (amount) ($\sigma$s) of from 75 to 130 A·m$^2$/kg, and an average oxide layer (or film) thickness of from 1.5 to 2.5 nm.

(2) A method of producing the ferromagnetic metal powder as described in the above item (1) reducing the oxide of a ferromagnetic metal element to obtain the ferromagnetic metal powder, subjecting the ferromagnetic metal powder to gradual oxidation treatment to make as 120 to 150 A·m$^2$/kg, adhering at least one element selected from Al, Y, lanthanoid, Zr and W to the ferromagnetic metal powder in water, performing heat treatment, and again performing the gradual oxidation treatment.

(3) A magnetic recording medium comprising a support having provided thereon a magnetic layer mainly comprising a ferromagnetic metal powder and a binder, wherein the ferromagnetic metal powder is the ferromagnetic metal powder as described in the above item (1), the magnetic layer has a thickness of from 0.04 to 0.25 $\mu$m, and demagnetization after storage at 60° C. 90% RH for one week of 10% or less.

The preferred embodiments of the present invention are as follows.

(a) The ferromagnetic metal powder is a ferromagnetic metal powder comprising a metallic part and an oxide layer (or film) present around the metallic part and having the variation coefficient of a long axis length of 25% or less, an average acicular ratio of from 3 to 9, and a coercive force (Hc) of from 135 to 320 kA/m.

(b) The metallic part of the ferromagnetic metal powder mainly comprises Fe or Fe—Co, and the Co content is from 8 to 45 mass % (i.e., weight %) based on Fe contained in the ferromagnetic metal powder.

(c) The oxide layer (or film) of the ferromagnetic metal powder contains at least one element selected from the group consisting of Al, Co, Y, lanthanoid, Zr and W.

(d) The residual magnetic flux ($\Phi$r) of the magnetic recording medium [residual magnetic flux density (Br)× magnetic layer thickness ($\delta$)] is from 5 to 75 mT·$\mu$m.

(e) The magnetic recording medium having a nonmagnetic layer mainly comprising a nonmagnetic powder and a binder resin between the support and the magnetic layer, and the surface roughness (defined in JIS B 0601) of the magnetic layer is 3.0 nm or less in central plane average surface roughness.

DETAILED DESCRIPTION OF THE INVENTION

In the first place, the ferromagnetic metal powder in the present invention is described below.

The ferromagnetic metal powder in the present invention is specified in sizes (i.e., an average long axis length and a crystallite size), oxide layer (or film) thickness and $\sigma$s. Electromagnetic characteristics can be improved by suppressing SFD and a magnetic recording medium excellent in weather-fastness can be obtained.

The peak of $\alpha$-Fe by X-ray diffraction is observed in the ferromagnetic metal powder in the present invention.

The long axis length of the ferromagnetic metal powder is from 30 to 65 nm, and more preferably from 35 to 60 nm. The variation coefficient of the long axis length is preferably 25% or less, and more preferably 20% or less.

The average acicular ratio [the average value of [(long axis length/short axis length)] is preferably from 3 to 9, and more preferably from 4 to 8. When the average acicular ratio is smaller than 3, coercive force (Hc) based on configuration anisotropy becomes small, which is disadvantageous for high density recording. When the average acicular ratio of the ferromagnetic metal powder is from 3 to 9, the larger the average acicular ratio, the higher is the coercive force (Hc). The variation coefficient of each of the long axis length and the acicular ratio of the ferromagnetic metal powder is preferably small, preferably 25% or less. When the variation coefficient of each of the long axis length and the acicular ratio is small, Hc distribution is small, in particular, high Hc factors (the rate of factors which are subjected to magnetic flux revolution in the magnetic field of 320 kA/m or more) decrease, which is preferred for overwriting characteristics. In the case where an average particle size is definite, when the variation coefficient of each of the long axis length and the acicular ratio is low, high Hc factor and Hc distribution are small, high coercive force factors are less, SFD (switching-field distribution) and SFDr show the tendency to lower.

The crystallite size of the ferromagnetic metal powder is a value which can be obtained by dividing the sum of the peaks of 110 plane and 220 plane (half value width) of $\alpha$-Fe by X-ray diffraction by 2, which is generally from 80 to 130 angstroms, preferably from 80 to 125 angstroms, and more preferably from 80 to 120 angstroms. When the crystallite size is smaller than 80 angstroms, Hc becomes small, and the weather-fastness is disadvantageously deteriorated. When it is greater than 130 angstroms, noise becomes markedly great, which is unfavorable.

$\sigma$s of the ferromagnetic metal powder in the present invention is from 75 to 130 A·m$^2$/kg, preferably from 80 to 125 A·m$^2$/kg, and more preferably from 82 to 120 A·m$^2$/kg. When gradual oxidation is heightened to increase the oxide layer (or film) thickness and to lower $\sigma$s, SFD becomes high, in particular, SFD conspicuous increases when the average long axis length is 65 nm or less. The reason SFD conspicuously increases at average long axis length of 65 nm or less is presumed that particles have particle size distribution, and fine particle factors in the range relatively showing high thermal fluctuation when the average long axis length becomes small increase. That is, it is thought due to the fact that the content of super-paramagnetic factors increases, further, that super-paramagnetic factors increase by lowering $\sigma$s by the gradual oxidation.

For lowering SFD, it is effective to control gradual oxidation conditions to make oxide layer (or film) on the surface of the ferromagnetic metal powder dense, and thin to the utmost.

Therefore, the average thickness of the oxide layer of the ferromagnetic metal powder in the present invention is necessary to be controlled to 1.5 to 2.5 nm.

As a preferred method to lower $\sigma$s by suppressing the oxide layer thickness within the above range, it has been found very effective to form a ferromagnetic metal powder of the oxide of a ferromagnetic metal element by reduction, subject the ferromagnetic metal powder to gradual oxidation treatment to make as 120 to 150 A·m$^2$/kg, adhere at least one element selected from Al, Y, lanthanoid, Zr and W to the ferromagnetic metal powder in water, perform heat treatment, and again perform gradual oxidation treatment.

When $\sigma$s is lower than 75 A·m$^2$/kg, not only SFD is drastically deteriorated but Hc becomes small, which is disadvantageous for high density recording. While when $\sigma$s is higher than 130 A·m$^2$/kg, Br (residual magnetic flux density) becomes high, and the residual magnetic flux ($\Phi$r) of the magnetic recording medium becomes high even when a magnetic layer thickness is thin, as a result, MR heads are saturated and have harmful influences upon recording such that the deformation of waveform and the asymmetry of pulse are caused. The higher the σs, the weaker is the durability of a magnetic layer, and the lower the σs, the better is the durability. Further, when packing density is reduced to make residual magnetic flux density low, the amount of the ferromagnetic metal powder present per unit area is decreased by thinning the magnetic layer thickness, as a result it follows that necessary S/N cannot is obtained.

For increasing the amount of the ferromagnetic metal powder present per unit area, it is important to make the saturation magnetization σs of the ferromagnetic metal powder as small as possible, which is useful for improving the durability and weather-fastness of a magnetic layer when used in a medium.

The coercive force (Hc) of the ferromagnetic metal powder is preferably from 135 to 320 kA/m, more preferably from 138 to 280 kA/m, and particularly preferably from 143 to 230 kA/m. As described above, it is presumed that the development of Hc based on configuration anisotropy and the distribution of Hc can be made small by defining the average long axis length and the average oxide layer (or film) thickness of the ferromagnetic metal powder, so that a magnetic recording medium low in Hc distribution and excellent in overwriting characteristics can be obtained by decreasing a magnetic layer thickness with use of the ferromagnetic metal powder according to the present invention.

The ferromagnetic metal powder for use in the present invention preferably contains, other than Fe, Co in an amount of from 8 to 45 mass % based on Fe, and more preferably from 10 to 35 mass %. Besides Fe and Co, it is preferred that the ferromagnetic metal powder according to the present invention contain the following atoms, e.g., Al, Si, S, Ti, V, Cr, Cu, Y, Mo, Rh, Pd, Ag, Sn, Sb, Te, Ba, Sr, W, Au, Pb, Bi, La, Ce, Pr, Nd, P, Mg, Mn, Zn, Sr, B and Ca, in an amount of 20 mass % (i.e., weight %) or less. These elements are effective for preventing sintering among particles, accelerating reduction, controlling the figure and the unevenness of the particle surface of the reduced ferromagnetic metal powder, including controlling the figures of starting materials.

In the present invention, it is preferred to by using the starting materials having small sizes and figures, in particular, the small variation coefficients of a long axis length and an acicular ratio, to make the size and the variation coefficient of the ferromagnetic metal powder small, and to use particles having a monocrystal structure away from conventional polycrystal states to the utmost.

The ferromagnetic metal powder in the present invention is preferably manufactured with monodispersion goethite or monodispersion hematite as the starting material, and reduced by pure hydrogen to be finally reduced to a metal, and it is useful to perform annealing treatment with $\alpha$-$Fe_2O_3$ for the purpose of making a rate of crystallization high. At the time of reduction from $\alpha$-$Fe_2O_3$ to $Fe_3O_4$ and FeO, various reducing gases can be used not pure hydrogen. Since it is known that water content is related to sintering at reduction, it is preferred to eliminate water generated by the reduction out of the system within a short period of time or to control the amount of water generated by the reduction for the purpose of restraining the formation of nuclei to one as far as possible and making a rate of crystallization high. Such controlling of water is effected by controlling partial pressure of a reducing gas or controlling the amount of reducing gas.

The surface oxide layer (or film) providing the average oxide layer thickness in the present invention can be formed, after formation of metallic part, by well-known oxidation process, e.g., the above gradual oxidation process, around the metallic part. When a carbon dioxide gas is contained in the gases used in the gradual oxidation process, since the carbon dioxide gas is adsorbed onto the points of bases of the surface of the ferromagnetic metal powder, such a gas may be contained.

As the oxides constituting the surface oxide layer of the ferromagnetic metal powder in the present invention, either magnetic oxides or nonmagnetic oxides may be used. Further, a small amount of metallic elements, e.g., Al, Mg, Si, Y, lanthanoid, Ca, Ba, Sr and Ni, may be present as a solid solution. As the magnetic oxides, those preferably having a saturation magnetization of from 50 to 90 A·m²/kg are exemplified. For example, $Co_xFe_{(1-x)}O_y$ (e.g., $CoFe_2O_4$, $CoFe_3O_4$), $FeO_x$ (e.g., $\gamma$-$Fe_2O_3$, $Fe_3O_4$, berthollide compound, provided that $1.33 \leq x \leq 2$) are exemplified as the iron oxide having magnetism. As the nonmagnetic oxides, a single compound or composite of crystalline and amorphous metal oxides, oxyhydroxide, hydroxide and hydrated oxide are included. These nonmagnetic oxides are primarily derived from the elements added as sintering inhibitors, and elements added at forming the starting material of the ferromagnetic metal powder.

The surface oxide layer (or film) comprises, e.g., a magnetic oxide alone, a nonmagnetic oxide alone, or both of them in combination, and the structure is not particularly limited. When the surface oxide layer (or film) comprises a combination of both of them, a magnetic oxide and a nonmagnetic oxide may be mixed with each other, or they may form layers independently.

When a magnetic oxide and a nonmagnetic oxide form layers independently on the surface part of a ferromagnetic metal particle, a metal phase and a magnetic oxide phase, and a magnetic oxide phase and a nonmagnetic oxide phase at the interface between each layer may be mixed. A magnetic oxide layer and a nonmagnetic oxide layer may be formed around the metallic part of a particle in order toward the surface direction of the particle.

The average oxide layer (or film) thickness of the ferromagnetic metal powder in the present invention means the average thickness of the above surface oxide layers, and this value is measured as follows.

A lattice image of a ferromagnetic metal particle is observed with a high resolution transmission electron microscope, and the thickness of the oxide layer (i.e., oxide film) present around the metallic part which predominates in the inside of the ferromagnetic metal particle is obtained from the total thickness of the ferromagnetic metal particle. The method is described specifically below. The particles dispersed in water by ultrasonic wave are placed on a mesh, the particles are photographed (300 kV) with a transmission electron microscope H-9000 (manufactured by Hitachi, Ltd.) to obtain a photograph of 3,000,000 magnifications. The central metallic part of the particle in the photograph is bad and the film part in the peripheral of the central part is observed in a whitish state. Subsequently, the boundary line of the interface between the metallic part and the film part, and the line on the surface of the film are taken in by a scanner, and the distance between the lines is automatically measured with an image analyzer KS-400 (manufactured by Kontron). The measurement is performed at 150 points per one particle with 15 particles (i.e., at 2,250 points), from which the average oxide layer thickness is obtained.

The crystallizability of the non-constituting part of the ferromagnetic metal powder can be analyzed with a crystal structure analyzer, such as X-ray diffraction, besides a transmission electron microscope. The composition and internal constitution of the particles can be further precisely analyzed by combining analyzers, such as ESCA, AFM and Auger capable of analysis in the depth direction.

The ferromagnetic metal powders according to the present invention may be previously treated with the later described dispersant, lubricant, surfactant, and antistatic agent before dispersion. The specific examples thereof are disclosed in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964, 39639/1973, U.S. Pat. Nos. 3,026,215, 3,031,341, 3,100,194, 3,242,005, and 3,389,014.

The ferromagnetic metal powders preferably have a water content of from 0.01 to 2 mass %. The water content of the ferromagnetic metal powders is preferably optimized within the above range according to the kinds of binders described later.

The ferromagnetic metal powders preferably have a tap density of from 0.2 to 0.8 g/ml. When a tap density is greater than 0.8 g/ml, uniform gradual oxidization of the ferromagnetic metal powder is difficult, thus the powder cannot be handled safely, or the magnetization of the produced magnetic recording medium reduces with the lapse of time. On the other hand, if a tap density is less than 0.2 g/ml, dispersion is liable to be insufficient.

A manufacturing method of the ferromagnetic metal powder in the present invention is described below.

Manufacturing methods of the ferromagnetic metal powder are not limited and ordinary methods can be used, but the following method is preferred. A starting material having uniform long axis length, acicular ratio and particle size is subjected to sintering preventing treatment, and the acicular ratio from a metal oxide (e.g., $FeO_x$: $1 \leq x \leq 1.5$, e.g., $Fe_2O_3$, $Fe_3O_4$) to a metal (e.g., Fe) can be controlled when reduced. As the starting material, monodispersed goethite or monodispersed hematite having no branching and uniform in particle size distribution can be exemplified.

In the starting material, the average long axis length is preferably from 40 to 100 nm, and the average acicular ratio is preferably from 4 to 12. It is important to make the starting material of uniform figure, long axis length and acicular ratio.

When a material having an average long axis length of smaller than 40 nm is used, desired Hc and Bm cannot be obtained. While when a material having an average long axis length of larger than 100 nm is used, there are cases where the surface roughness of the resulting magnetic recording medium becomes large, noise becomes large, and excellent S/N cannot be obtained. When the average acicular ratio is larger than 12, sometimes the packing density of the magnetic recording medium becomes small, high coercive force factors increase, and overwriting characteristics have a tendency to be deteriorated. When the average acicular ratio is smaller than 4, the coercive force is small when produced to a ferromagnetic metal powder, and in some cases, the ferromagnetic metal powder can be hardly used in a medium for high density recording.

Further, as the means for controlling the ferromagnetic metal powder, the following methods (1) and (2) can be exemplified.

(1) To specify the element composition in the interior of the ferromagnetic metal powder. In particular, in the case of the ferromagnetic metal powder where the metallic part comprises Fe or Fe—Co as the main component, a trace element which interacts with Fe is specified. As the trace element, Ca, Mn, Ni, Cr and Mg are preferred. It is preferred to add the trace element at the time of manufacturing goethite or hematite and/or after the manufacture, by surface treatment. It is also an important factor to dope and/or adhere a sintering inhibitor for preventing sintering. Si, Al, Y and lanthanoid are known to be effective as sintering inhibitors.

(2) In the technique of reducing the oxide of a ferromagnetic metal element to a ferromagnetic metal powder, to select the pretreatment before reduction, e.g., dehydrating conditions of goethite, annealing conditions (e.g., temperature, atmosphere, processing time, temperature difference between the initial stage and the latter half stage); and reduction conditions, e.g., temperature, reducing gases, and reduction treatment time. In particular, for retaining the sizes of the long axis length and the short axis length of the ferromagnetic metal powder uniform and the acicular ratio in the range of from 3 to 9, it is very important to perform figure control and crystallizability control of the metallic part, and thickness control and crystallizability control of the oxide layer by the phased and repeated reduction treatment and gradual oxidation treatment.

Specifically, the conditions of treating the trace element-containing goethite obtained in the above (1) are as follows. As the dehydration conditions, dehydration is performed in a standing type or rotary electric furnace in a nitrogen atmosphere generally at 250 to 400° C., preferably from 300 to 400° C., for 0.5 to 2 hours, preferably from 0.5 to 1 hour. As the annealing conditions, annealing is performed in a standing type reducing furnace in a nitrogen atmosphere generally at 500 to 800° C., preferably from 550 to 700° C., for 1 to 5 hours, preferably from 2 to 3 hours. A step of washing the hematite obtained by the dehydration treatment and eliminating soluble alkaline metals may be provided after the dehydration treatment and before the annealing treatment. It is effective to control the figure and crystallizability of the metallic part, and to control the thickness and crystallizability of the oxide layer by phased temperature rise and repeated treatment, for example, dehydration, annealing and gradual oxidation are performed at first at low temperature and gradually to high temperature, preferably the initial stage of the dehydration treatment is performed at 250 to 300° C., then at 300 to 350° C., and the last stage at 350 to 400° C., and the annealing is performed at 500 to 550° C. initially, then at 550 to 650° C., and the last stage at 600 to 800° C.

As the conditions of the reduction, reduction is performed in a standing type reducing furnace in a hydrogen atmosphere generally at 350 to 600° C., preferably from 425 to 530° C., generally for 0.25 to 1 hour, preferably from 0.25 to 0.5 hour, then heating is performed, after the atmosphere is replaced with nitrogen, generally at 450 to 650° C., preferably from 500 to 600° C., generally for 0.5 to 3 hours, preferably from 1 to 2 hours, and then reduction is performed for 3 to 5 hours at the above temperature after the atmosphere is replaced with pure hydrogen. For example, it is very effective to control the figure of the metallic part and increase the crystallizability of the metallic part by the phased and repeated reduction treatment, for example, at first at low temperature and gradually to high temperature, preferably the initial stage of the reduction treatment is performed at 350 to 470° C., then at 370 to 620° C., and the last stage at 450 to 620° C. (and the temperature is raised 10° C. or more in each stage).

The termination of the reduction is decided by measuring the water content in the gas of the drainage system by a dew point recorder. Well-known methods, e.g., the methods disclosed in Japanese Patent Laid-Open Nos. 109122/1995 and 340426/1994 can be applied to the present invention. As the ferromagnetic metal element of the metallic part of the ferromagnetic metal powder, it is preferred to use Fe or Fe—Co as the main component. "The main component" used here means that the component accounts for 75 mass % (i.e., weight %) or more based on the total mass (i.e., the total weight) of the metallic part. Co is particularly preferred in view of capable of making as high and forming a dense and thin oxide layer.

The Co content of the ferromagnetic metal powder is preferably from 8 to 45 wt % based on Fe contained in the ferromagnetic metal powder, more preferably from 10 to 42 wt %. As described above, it is preferred that Co is partly doped into a starting material, then a required amount is added to the starting material by adhesion on the surfaces of the particles, and alloyed by reduction.

After completion of the reduction of oxides, a metallized powder is subjected to gradual oxidation treatment.

The atmosphere of the gradual oxidation treatment is an inert gas atmosphere containing oxygen. As the inert gas atmosphere, a nitrogen gas, a helium gas and an argon gas are preferably used, and a nitrogen gas is particularly preferred. The content of oxygen is preferably from 0.1 to 5 vol %, and it is preferred that the amount of oxygen is gradually increased until a prescribed amount. The inert gas atmosphere may contain water vapor. When water vapor is contained, a spindle-like alloy magnetic particle powder having a high coercive force is easily obtained. Gradual oxidation treatment is performed preferably at 40 to 200° C., more preferably from 40 to 180° C. When the temperature is less than 40° C., it is difficult to form a surface oxide layer having a sufficient thickness, and the reduction of magnetic characteristics by washing becomes conspicuous. While when the temperature of gradual oxidation treatment is higher than 200° C., the figures of the particles are deformed, in particular, since a large amount of oxides are formed, short axes are extremely expanded and, in some cases, figure collapse is liable to occur, which is not preferred.

After being subjected to gradual oxidation treatment, the ferromagnetic metal powder may be subjected repeatedly to heat treatment, reduction treatment and surface oxidation treatment (gradual oxidation treatment). By repeating these treatments, dense ferromagnetic metal powder can be easily obtained.

In particular, by adhering, in water, at least one element selected from Al, Y, lanthanoid, Zr and W onto the ferromagnetic metal powder having as of from 120 to 150 A·m²/kg obtained by being subjected to gradual oxidation treatment, and then again performing heat treatment and gradual oxidation treatment, the ferromagnetic metal powder of the present invention can be obtained.

The ferromagnetic metal powder having as of from 120 to 150 A·m²/kg obtained by being subjected to gradual oxidation treatment is roughly pulverized and put in water (ion exchange water is preferred), to thereby obtain a suspension of the ferromagnetic metal powder. An aqueous solution having dissolved therein a metal salt for surface treatment is added to the suspension in an appropriate amount according to the purpose and adhered to the surface of the ferromagnetic metal powder. The temperature of the suspension at surface treatment is preferably from room temperature to 200° C. The element of the metal salt to be added is at least one element selected from Al, Y, lanthanoid, Zr and W. Lanthanoid is specifically La, Ce, Pr, Nd, Pm, Sm, Eu, Gd, Tb, Dy, Ho, Er, Tm, Yb or Lu, and La, Ce, Nd, Sm and Gd are particularly preferred.

The element-adhered ferromagnetic metal powder is then heat treated and again subjected to gradual oxidation treatment, thereby the ferromagnetic metal powder according to the present invention can be obtained. In place of heat treatment or after heat treatment, heat reduction treatment may be performed.

The heat treatment is preferably performed by standing in a non-oxidizing atmosphere, such as nitrogen, at 60 to 400° C. for 0.5 to 48 hours, more preferably standing at 100 to 350° C. for 0.5 to 48 hours.

Water-washing treatment may be performed after surface treatment (adhesion of element) and before heat treatment, if necessary, and the washing treatment is generally followed by dehydration and drying treatments. Since a water-soluble salt on the surface of the ferromagnetic metal powder can be eliminated, water washing of the ferromagnetic metal powder before heat treatment is preferred.

Dehydration of the ferromagnetic metal powder may be performed after washing and filtration as it is, but it is preferred that water is replaced with an organic solvent after washing and then subjected to dehydration. As the organic solvent, a hydrophilic organic solvent having a boiling point of 100° C. or less is used. Specifically, acetone (boiling point: 56.5° C.), ethanol (boiling point: 78.3° C.), and methanol (boiling point: 64.1° C.) are used. After filtration, the ferromagnetic metal powder is granulated and dried.

It is preferred that the gradual oxidation treatment is performed according to the gradual oxidation conditions performed as the pre-stage before being subjected to the surface treatment process.

The magnetic recording medium according to the present invention is described below.

The magnetic recording medium according to the present invention has sufficient weather-fastness by suppressing the demagnetization of the magnetic layer after storage at 60° C. 90% RH for one week to 10% or less. However, the lower the value, the better is the weather-fastness.

The demagnetization of the magnetic layer $\Delta\Phi m$ (%) means a value obtained by the following method.

$\Delta\Phi m$ (%)=100×($\Phi m$ before storage−$\Phi m$ after storage)/$\Phi m$ during storage $\Phi m$: maximum magnetic flux Measurement was performed using a vibrating sample magnetometer VSM-5 (a product of Toei Kogyo Co., Ltd.), time constant of 0.1 second, sweep speed of 3 second/10 kOe [Oe=(1/4n)kA/m], and the measuring magnetic field of 10 kOe.

The residual magnetic flux ($\Phi r$) of the magnetic layer according to the present invention [residual magnetic flux density (Br)×magnetic layer thickness ($\delta$)] is preferably from 5 to 75 mT·$\mu$m, more preferably from 10 to 70 mT·$\mu$m, and particularly preferably from 15 to 60 mT·$\mu$m. It is preferred that the optimal value of the residual magnetic flux ($\Phi r$) of the magnetic layer is set up by the performance of the MR heads, and it is preferred to select a value on the high side but within the range where the MR heads are not saturated.

The magnetic layer preferably has Hc of from 135 to 320 kA/m, more preferably from 150 to 300 kA/m, and particularly preferably from 160 to 240 kA/m. When Hc is less than 135 kA/m, output is insufficient, and the amount of low Hc factors increases, so that a drawback of thermal fluctuation arises. When Hc is greater than 320 kA/m, overwriting characteristics are influenced. Further, electric current for recording is insufficient, the heads are saturated, resulting in the generation of deformation and insufficient output. This tendency is conspicuous in the system using a head of high sensitivity, e.g., a magneto-resistance type (MR) head.

When Hc, Br and $\Phi r$ are smaller than the above lower limits, short wave output cannot be obtained sufficiently in some cases, while when they are greater than the upper limits, the heads for use for recording are saturated, as a result, output cannot be secured sometimes.

The magnetic recording medium according to the present invention fundamentally comprises a support having provided thereon a magnetic layer containing at least the ferromagnetic metal powder of the present invention, and the layer constitution is not particularly restricted so long as the magnetic layer is provided on one side of the support or on both sides. The magnetic layer may be a single layer or may comprise two or more layers. In the latter case, these layers may be provided in contiguous to each other, or a layer other than a magnetic layer may intervene between magnetic layers, and well-known layer constitution can be applied to the present invention. In the present invention, the thickness of the magnetic layer is the dry thickness of the uppermost magnetic layer when a plurality of layers are present.

The thickness of the magnetic layer is from 0.04 to 0.25 $\mu$m, preferably from 0.04 to 0.23 $\mu$m, and more preferably from 0.05 to 0.22 $\mu$m.

In the magnetic recording medium according to the present invention, it is preferred to provide a nonmagnetic layer containing a nonmagnetic powder and a binder as main components between the support and the magnetic layer. In this case, the surface roughness of the magnetic layer is a central plane surface roughness (Ra) (defined in JIS B 0601) of preferably 3.0 nm or less, more preferably from 1.0 to 2.8 nm.

As the example of the constitution comprising a plurality of magnetic layers, combinations of magnetic layers containing a ferromagnetic metal powder selected from an iron oxide ferromagnetic powder, a cobalt-modified iron oxide ferromagnetic powder, a $CrO_2$ powder, a hexagonal ferrite powder, and various ferromagnetic metal powders dispersed in a binder are exemplified. In this case, the same kinds of ferromagnetic metal powders having different element compositions and particle sizes may be used in combination.

A magnetic recording medium having a nonmagnetic layer between a support and a magnetic layer containing a ferromagnetic metal powder is preferred in the present invention. In the positional relationship of the layers of such layer constitution, a magnetic layer is called an upper layer and a nonmagnetic layer is called a lower layer.

The lower layer is described in detail below. The lower layer is substantially nonmagnetic, and preferably it is a layer containing a nonmagnetic powder and a binder, but the lower layer is not limited thereto. The lower layer may contain a magnetic powder in the range of substantially nonmagnetic. "The lower layer is substantially nonmagnetic" means that the lower layer maybe magnetic within the range not substantially reducing the electromagnetic characteristics of the upper layer.

Nonmagnetic powders can be selected from the following inorganic compounds such as metal oxide, metal carbonate, metal nitride and metal carbide. The examples of inorganic compounds are selected from the following compounds and they can be used alone or in combination, e.g., $\alpha$-alumina having an alpha-conversion of 90% or more, $\beta$-alumina, $\gamma$-alumina, $\theta$-alumina, silicon carbide, chromium oxide, cerium oxide, $\alpha$-iron oxide, goethite, silicon nitride, titanium dioxide, silicon dioxide, tin oxide, magnesium oxide, zirconium oxide, zinc oxide, and barium sulfate. Of these compounds, particularly preferred compounds are titanium dioxide, zinc oxide, $\alpha$-iron oxide and barium sulfate, because they have small particle size distribution and various means for imparting functions, and more preferred compounds are titanium dioxide and $\alpha$-iron oxide. The preferred $\alpha$-iron oxides are those prepared by heating and dehydrating iron oxide starting materials having a uniform particle size for use for preparing magnetic iron oxide and metallic powders, annealing to lessen voids, and if necessary, performing surface treatment. Since titanium dioxide has generally the property of a photocatalyst, radicals are generated when exposed to light and the radicals react with a lubricant. Therefore, it is necessary to decrease photocatalytic characteristics of the titanium dioxide for use in the present invention by a solid solution of from 1 to 10% of Al or Fe. It is also preferred to treat the surface of the titanium dioxide with Al or Si compound to lower the catalytic function. These nonmagnetic powders preferably have a particle size of from 0.005 to 2 $\mu$m. If desired, a plurality of nonmagnetic powders each having a different particle size may be combined, or a single nonmagnetic powder having a broad particle size distribution may be employed so as to attain the same effect as such combination.

A particularly preferred particle size of the non-magnetic powders is from 0.01 to 0.5 $\mu$m. In particular, when the nonmagnetic powder is a granular metal oxide, the average equivalent-circle diameter is preferably 0.08 $\mu$m or less, and when it is an acicular metal oxide, the long axis length is preferably 0.3 $\mu$m or less, more preferably 0.2 $\mu$m or less. Nonmagnetic powders for use in the present invention have a tap density of generally from 0.3 to 1.5 g/ml, preferably from 0.4 to 1.3 g/ml; a water content of generally from 0.2 to 5 mass %, preferably from 0.3 to 3 mass %, and more preferably from 0.3 to 1.5 mass %; a pH value of generally from 2 to 12, particularly preferably between 5.5 and 11; a specific surface area ($S_{BET}$) of generally from 1 to 100 m$^2$/g, preferably from 5 to 80 m$^2$/g, and more preferably from 10 to 80 m$^2$/g; a crystallite size of preferably from 40 to 1,000 angstroms, more preferably from 40 to 800 angstroms; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1.5 to 7, preferably from 3 to 6. The figure of nonmagnetic powders maybe any of acicular, spherical, polyhedral, or tabular figures. Nonmagnetic powders preferably have an SA (stearic acid) absorption amount of from 1 to 20 $\mu$mol/m$^2$, preferably from 2 to 15 $\mu$mol/m$^2$, and more preferably from 3 to 8 $\mu$mol/m$^2$. When a nonmagnetic powder having a high stearic acid absorption amount is used, it is preferred to form a magnetic recording medium by modifying the surface of the nonmagnetic powder with an organic substance which is strongly adsorbed onto the surface.

It is preferred that these nonmagnetic powders are subjected to surface treatment with compounds containing elements such as Al, Mg, Si, Ti, Zr, Sn, Sb, Zn and Y. As the oxides formed on the surfaces of these nonmagnetic powders by this surface treatment, particularly preferred oxides in dispersibility are $Al_2O_3$, $SiO_2$, $TiO_2$, $ZrO_2$, MgO and water-containing oxides of these oxides, and $Al_2O_3$, $SiO_2$, $ZrO_2$ and water-containing oxides of these oxides are more preferred. They can be used in combination or alone. A method in which the surface treatment may be performed by coprecipitation, alternatively, surface treatment of particles maybe previously performed to be covered with alumina in the first place, and then the alumina-covered surface is covered with silica, or vice versa, according to purposes. The surface-treated layer may be porous layer, if necessary, but a homogeneous and dense surface is generally preferred.

The specific examples of the nonmagnetic powders for use in the lower layer according to the present invention include Nanotite (manufactured by Showa Denko Co., Ltd.), HIT-110 and HIT-82 (manufactured by Sumitomo Chemical Co., Ltd.), α-iron oxide DPN-250BX, DPN-245, DPN-270BX, DPN-500BX, DPN-550RX, DBN-650RX and DAN-850RX (manufactured by Toda Kogyo Co., Ltd.), titanium oxide TTO-51B, TTO-55A, TTO-55B, TTO-55C, TTO-55S, TTO-55D and SN-100 (manufactured by Ishihara Sangyo Kaisha Ltd.), titanium oxide STT-4D, STT-30D, STT-30, STT-65C and α-iron oxide α-40 (manufactured by Titan Kogyo Co., Ltd.), titanium oxide MT-100S, MT-100T, MT-150W, MT-500B, MT-600B, MT-100F, and MT-500HD (manufactured by Tayca Corp.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and $TiO_2P25$ (manufactured by Nippon Aerosil Co., Ltd.), and 100A, 500A and calcined products thereof (manufactured by Ube Industries Ltd.).

By the incorporation of carbon black into the lower layer, a desired micro Vickers' hardness can be obtained in addition to the well-known effects of reducing surface electrical resistance (Rs) and light transmittance. The carbon blacks for use in the lower layer may be used as the above nonmagnetic powders. Further, it is also possible to obtain the effect of stocking a lubricant by the incorporation of carbon black into the lower layer. Various furnace black for rubbers, various thermal blacks for rubbers, carbon black for coloring, electrically conductive carbon blacks, and acetylene black can be used. The carbon black used in the lower layer should optimize the following characteristics by the desired effects and sometimes more effects can be obtained by the combined use.

The carbon black for use in the lower layer according to the present invention has a specific surface area ($S_{BET}$) of generally from 50 to 500 $m^2/g$, preferably from 70 to 400 $m^2/g$, a DBP absorption of generally from 20 to 400 ml/100 g, preferably from 30 to 400 ml/100 g, an average particle size of generally from 5 to 80 nm, preferably from 10 to 50 nm, and more preferably from 10 to 40 nm, pH of from 2 to 10, a water content of from 0.1 to 10 mass %, and a tap density of from 0.1 to 1 g/ml. The specific examples of the carbon blacks for use in the present invention include BLACKPEARLS 2000, 1300, 1000, 900, 800, 880 and 700 (manufactured by Cabot Co., Ltd.), XC-72 (manufactured by VULCAN Co.), #3050B, #3150B, #3750B, #3950B, #950, #650B, #970B, #850B, MA-600, MA-230, #4000 and #4010 (manufactured by Mitsubishi Chemical Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). The carbon black for use in the present invention may previously be surface-treated with a dispersant, may be grafted with a resin, or a part of the surface thereof may be graphitized before use. The carbon black may be previously dispersed in a binder before addition to the magnetic coating solution. These carbon blacks can be used within the range not exceeding 50 mass % based on the above inorganic powders and not exceeding 40 mass % based on the total weight of the nonmagnetic layer. These carbon black can be used alone or in combination. Regarding carbon blacks which can be used in the present invention, for example, *Carbon Black Binran* (*Handbook of Carbon Blacks*) (edited by Carbon Black Association) may be referred to.

Organic powders may be used in the lower layer according to the purpose. The examples of preferred organic powders include an acryl styrene resin powder, a benzoguanamine resin powder, a melamine resin powder, and a phthalocyanine pigment. In addition, a polyolefin resin powder, a polyester resin powder, a polyamide resin powder, a polyimide resin powder, and a polyethylene fluoride resin powder can also be used. The producing methods thereof are disclosed in Japanese Patent Laid-Open Nos. 18564/1987 and 255827/1985.

Binders (the kind and amount); the amounts and kinds of lubricants, dispersants and additives; solvents; and dispersing methods used for the magnetic layer can be used in the lower layer.

Conventionally well-known thermoplastic resins, thermosetting resins, reactive resins and mixtures of these resins are used as a binder resin in the magnetic layer or the nonmagnetic layer of the magnetic recording medium in the present invention. Thermoplastic resins having a glass transition temperature of from −100 to 150° C., a number average molecular weight of from 1,000 to 200,000, preferably from 10,000 to 100,000, and a polymerization degree of from about 50 to 1,000 can be used in the present invention.

The examples thereof include polymers or copolymers containing as a constituting unit the following compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins.

The examples of thermosetting resins and reactive resins include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate.

Preferably, at least one polar group selected from the following groups is introduced into the above binder resins by copolymerization or addition reaction for the purpose of further improving the dispersibility and the durability of the ferromagnetic powders, e.g., —COOM, —$SO_3M$, —$OSO_3M$, —P=$O(OM)_2$, —O—P=$O(OM)_2$ (wherein M represents a hydrogen atom, or an alkali metal salt group), —OH, —$NR_2$, —$N^+R_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

The amount of the binder for use in the magnetic recording medium according to the present invention is from 5 to 50 mass %, preferably from 10 to 30 mass %, based on the ferromagnetic powder. When vinyl chloride resins are used, the amount of the resins is from 5 to 100 mass %, when polyurethane resins are used, the amount of the polyurethane resin is from 0 to 100 mass %, and it is preferred that polyisocyanate is used in an amount of from 2 to 100 mass % in combination with these resins.

When polyurethane is used in the present invention, the polyurethane has a glass transition temperature of from −50 to 100° C., breaking extension of from 100 to 2,000%, breaking stress of from 0.05 to 10 kg/mm² (=about 0.49 to 98 MPa), and a yielding point of from 0.05 to 10 kg/mm² (=about 0.49 to 98 MPa).

The examples of the polyisocyanates which can be used in the present invention include isocyanates, e.g., tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate, and triphenylmethane triisocyanate; the reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone or in combinations of two or more thereof, taking advantage of a difference in curing reactivity.

Materials having various functions, for example, a lubricant, an abrasive, a dispersant, an antistatic agent, a plasticizer, and an antibacterial agent are generally added to the magnetic layer and/or the nonmagnetic layer of the magnetic recording medium of the present invention according to purposes.

The examples of the lubricants which can be used in the present invention include silicone oils such as dialkylpolysiloxane (the alkyl has from 1 to 5 carbon atoms), dialkoxypolysiloxane (the alkoxy has from 1 to 4 carbon atoms), monoalkylmonoalkoxypolysiloxane (the alkyl has from 1 to 5 carbon atoms and the alkoxy has from 1 to 4 carbon atoms) phenylpolysiloxane, and fluoroalkylpolysiloxane (the alkyl has from 1 to 5 carbon atoms); electrically conductive fine powders such as graphite; inorganic powders such as molybdenum disulfide and tungsten disulfide; plastic fine powders such as polyethylene, polypropylene, polyethylene-vinyl chloride copolymers, and polytetrafluoroethylene; α-olefin polymers; saturated fatty acids which are solid at normal temperature (having from 10 to 22 carbon atoms); unsaturated aliphatic hydrocarbons which are liquid at normal temperature (compounds having n-olefinic double bonds bonded to the terminal carbons, having about 20 carbon atoms); fatty acid esters comprising a monobasic fatty acid having from 12 to 20 carbon atoms and a monovalent alcohol having from 3 to 12 carbon atoms, and fluorocarbons.

Of the above compounds, saturated fatty acids and fatty acid esters are preferably used, and a combination of both are more preferably used. As the saturated fatty acid, lauric acid, myristic acid, stearic acid, palmitic acid, behenic acid and arachic acid are exemplified. The examples of raw material alcohols of fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and s-butyl alcohol, and polyhydric alcohols such as ethylene glycol, diethylene glycol, neopentyl glycol, glycerin, and sorbitan derivatives. The examples of raw material fatty acids include aliphatic carboxylic acid such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid, and mixture of these acids.

The specific examples of fatty acid esters include various ester compounds, e.g., butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixtures of butyl stearate and butyl palmitate, butoxyethyl stearate, 2-butoxy-1-propyl stearate, products obtained by esterifying dipropylene glycol monobutyl ether with stearic acid, diethylene glycol dipalmitate, diesterified products obtained by esterifying hexamethylenediol with myristic acid, and glycerin oleate.

To decrease the hydrolysis of fatty acid esters which is often caused when a magnetic recording medium is used under high humidity, it is preferred to select raw material fatty acids and branch/straight chain of alcohols, anisotropic structure such as cis/trans, and branching positions. These lubricants are added in an amount of from 0.2 to 20 mass parts per 100 mass parts (i.e., weight parts) of the binder.

The following compounds can also be used as a lubricant, e.g., silicon oil, graphite, molybdenum disulfide, boron nitride, graphite fluoride, fluorinated alcohol, polyolefin, polyglycol, alkyl phosphate, and tungsten disulfide.

As the abrasive for use in the present invention, well-known materials having a Mohs' hardness of 6 or more are used, e.g., α-alumina, γ-alumina, fused alumina, corundum, artificial corundum, silicon carbide, chromium oxide ($Cr_2O_3$) diamond, artificial diamond, garnet, emery (main components: corundum and magnetite) and α-$Fe_2O_3$. The specific examples of abrasives for use in the present invention include AKP-10, AKP-12, AKP-15, AKP-20, AKP-30, AKP-50, AKP-1520, AKP-1500, HIT-50, HIT-60A, HIT-70, HIT-80 and HIT-100 (manufactured by Sumitomo Chemical Co., Ltd.), G5, G7, S-1, chromium oxide K (manufactured by Nippon Chemical Industrial Co., Ltd.), UB40B (manufactured by Uemura Kogyo K.K.), WA8000 and WA10000 (manufactured by Fujimi Kenma K.K.), and TF100, TF140 and TF180 (manufactured by Toda Kogyo Co., Ltd.). Abrasives having an average particle size of from 0.05 to 3 μm are effective, and preferably from 0.05 to 1.0 μm.

The total amount of these abrasives is generally from 1 to 20 mass parts (i.e., weight parts) per 100 mass parts (i.e., weight parts) of the magnetic powder, and preferably from 1 to 15 mass parts. When the addition amount is less than 1 mass part, sufficient durability cannot be obtained, while when the amount is more than 20 mass parts, the surface property and the packing density are deteriorated. Abrasives may be dispersed in a binder in advance before being added to a magnetic coating solution.

The magnetic layer in the magnetic recording medium according to the present invention can contain electrically conductive particles as the antistatic agent besides the above nonmagnetic powders. In the magnetic recording medium having a nonmagnetic layer between the support and the magnetic layer, the addition amount of the antistatic agent to the upper layer is preferably as small as possible and it is preferred to add the antistatic agent to coating layers other than the upper layer for the purpose of increasing the saturation magnetic flux density of the upper layer to the utmost. As the antistatic agent, carbon blacks are particularly preferably used in view of capable of reducing the surface electrical resistance of the magnetic recording medium itself. Various furnace blacks for rubbers, various thermal blacks for rubbers, carbon blacks for coloring, electrically conductive carbon blacks and acetylene blacks can be used as carbon blacks in the present invention. Carbon blacks preferably have a specific surface area ($S_{BET}$) of from 5 to 500 m²/g, a DBP oil absorption of from 10 to 1,500 ml/100 g, a particle size of from 5 to 300 nm, pH of from 2 to 10, a water content of from 0.1 to 10 mass %, and a tap density of from 0.1 to 1 g/ml. The specific examples of carbon blacks for use in the present invention include BLACK-PEARLS 2000, 1300, 1000, 900, 800 and 700, and VULCAN XC-72 (manufactured by Cabot Co., Ltd.), #80, #60, #55, #50 and #35 (manufactured by Asahi Carbon Co., Ltd.), #3950B, #2700, #2650, #2600, #2400B, #2300, #900, #1000, #95, #30, #40, #10B, MA230, MA220 and MA77 (manufactured by Mitsubishi Kasei Corp.), CONDUCTEX SC, RAVEN 150, 50, 40 and 15 (manufactured by Columbia Carbon Co., Ltd.), and Ketjen Black EC, Ketjen Black ECDJ-500 and Ketjen Black ECDJ-600 (manufactured by Lion Akzo Co., Ltd.). Carbon blacks for use in the present invention may be surface-treated with a dispersant, maybe subjected to oxidation treatment, may be grafted with a resin, or a part of the surface of carbon blacks may be graphitized before use. Carbon blacks may be previously dispersed in a binder before addition to a magnetic coating solution. Carbon blacks are added to a magnetic layer in an amount of preferably from 0.1 to 3 mass % based on the magnetic powder. It is preferred to add carbon blacks to a nonmagnetic layer in an amount of from 3 to 20 mass % based on the amount of the inorganic nonmagnetic powder (provided that carbon blacks are not added to the nonmagnetic powder).

Carbon blacks are generally not only used as an antistatic agent but also have functions of reducing a friction coefficient, providing a light-shielding property, and improving film strength, and carbon blacks having appropriate functions are selected. Accordingly, these carbon blacks can be used properly by changing the kind, the amount and the combination based on diverse characteristics, e.g., a particle size, an oil absorption amount, electrical conductance and pH. With respect to carbon blacks which can be used in the present invention, *Carbon Black Binran* (*Handbook of Carbon Blacks*), compiled by Carbon Black Kyokai can be referred to.

When the magnetic recording medium according to the present invention has two or more coating layers on a support, these layers are coated by successive coating (wet-on-dry) or simultaneous coating (wet-on-wet). The latter method can form an ultra-thin magnetic layer, therefore, particularly excellent. The specific methods of simultaneous coating, i.e., wet-on-wet coating, are described below.

(1) A method of coating a lower layer by any of gravure coating, roll coating, blade coating, and extrusion coating apparatuses, which are ordinarily used in the coating of a magnetic coating solution, and then coating an upper layer while the lower layer is still wet by means of the support pressing type extrusion coating apparatus disclosed, e.g., in Japanese Patent Publication No. 46186/1989, Japanese Patent Laid-Open Nos. 238179/1985 and 265672/1990.

(2) A method of coating an upper layer and a lower layer almost simultaneously using the coating head equipped with two slits for feeding coating solution as disclosed in Japanese Patent Laid-Open Nos. 88080/1988, 17971/1990 and 265672/1990.

(3) A method of coating an upper layer and a lower layer almost simultaneously using the extrusion coating apparatus equipped with a backup roll as disclosed in Japanese Patent Laid-Open No. 174965/1990.

When coating is performed by a wet-on-wet method, flowing characteristics of a nonmagnetic layer coating solution are preferably closer to those of a magnetic layer coating solution as far as possible, because the turbulence does not occur at the interface between a magnetic layer and a nonmagnetic layer coated and a uniform magnetic layer showing less thickness variation can be obtained. The flowing characteristics of a coating solution largely depend upon the combination of the powder particles and the binder resin in a coating solution, therefore, a nonmagnetic powder for use in the nonmagnetic layer should be selected carefully.

The thickness of the support of a magnetic recording medium according to the present invention is generally from 1 to 100 $\mu$m, and when the support is used as a tape-like medium, the thickness is preferably from 3 to 20 $\mu$m, and when used as a flexible disc, the thickness is preferably from 40 to 80 $\mu$m. The thickness of the nonmagnetic layer provided on a support is generally from 0.5 to 10 $\mu$m, preferably from 0.5 to 3 $\mu$m.

A layer other than the above-described magnetic layer and nonmagnetic layer may be provided according to the purpose. For example, an undercoating layer may be provided between the support and the lower layer for adhesion improvement. The thickness of this undercoating layer is generally from 0.01 to 2 $\mu$m, preferably from 0.05 to 0.5 $\mu$m. A back coating layer may be provided on the surface side of the support opposite to the side having the magnetic layer. The thickness of this back coating layer is generally from 0.1 to 2 $\mu$m, preferably from 0.3 to 1.0 $\mu$m. Well-known undercoating layers and back coating layers can be used. In the case of a disc-like magnetic recording medium, the above layer constitution can be provided on both surface sides of the support or may be provided on either one surface side.

A support for use in the present invention is not particularly limited and ordinarily used support can be used. The examples of materials for forming a support include various synthetic resin films such as polyethylene terephthalate, polyethylene, polypropylene, polycarbonate, polyethylene naphthalate, polyamide, polyamideimide, polyimide, polysulfone, and polyether sulfone, and metal foils, e.g., aluminum foil, and stainless steel foil.

For effectively attaining the object of the present invention, it is preferred to use the support having a central plane average surface roughness (Ra) (cut-off value of 0.25 mm: defined in JIS B 0601) of 0.03 $\mu$m or less, preferably 0.02 $\mu$m or less, and more preferably 0.01 $\mu$m or less. It is preferred that the support not only has a small central line average surface roughness but also is free from coarse protrusions having a height of 1 $\mu$m or more. Surface roughness configuration is freely controlled by the size and the amount of fillers added to the support. The examples of such the fillers include acryl-based organic resin fine powders, as well as oxides or carbonates of Ca, Si and Ti. The support for use in the present invention preferably has an F-5 value of from 5 to 50 kg/mm$^2$ (=about 49 to 490 MPa) in the web-running direction and an F-5 value of from 3 to 30 kg/mm$^2$ (=about 29.4 to 294 MPa) in the transverse direction of the web. In general, the F-5 value in the machine direction of the web is higher than that in the transverse direction thereof. However, this arrangement does not apply to the case where the transverse strength of the web is intended to be especially elevated.

The thermal shrinkage at 100° C. for 30 minutes of the support for use in the present invention is preferably 3% or less and more preferably 1.5% or less, in both the web-running direction and the width direction, and further the thermal shrinkage at 80° C. for 30 minutes is preferably 1% or less, more preferably 0.5% or less in both directions. The breaking strength of the support is preferably from 5 to 100 kg/mm$^2$ (=about 49 to 980 MPa), and the modulus of elasticity thereof is preferably from 100 to 2,000 kg/mm$^2$ (=about 0.98 to 19.6 GPa).

Organic solvents for use in the present invention may be used in an optional proportion. The examples of suitable organic solvents include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chlorofrom, ethylenechlorohydrin and dichlorobenzene; N,N-dimethylformamide, and hexane. These organic solvents may be used as mixture or may be used alone. The organic solvents for use in the present invention need not be 100% pure and may contain impurities such as isomers, non-reacted materials, byproducts, decomposed products, oxides and water, in addition to the main component. However, the content of such impurities is preferably 30% or less, more preferably 10% or less. The kinds and amounts of the organic solvents to be used in the magnetic layer and the nonmagnetic layer of the present invention may be varied, if necessary. For instance, a highly volatile solvent is used in the nonmagnetic layer to improve the surface property, a solvent having a high surface tension (e.g., cyclohexanone or dioxane) is used in the nonmagnetic layer so as to improve the coating stability, a solvent having a high solubility parameter is used in the magnetic layer to increase the packing density, but examples are not limited thereto.

The magnetic recording medium according to the present invention is produced by kneading and dispersing nonmagnetic powders or ferromagnetic powders, binder and, if necessary, other additives, with an organic solvent. The thus-obtained nonmagnetic coating solution and magnetic coating solution are coated on a support, oriented according to necessity, and dried.

Processes of preparing the magnetic coating solution for use in the magnetic recording medium of the present invention comprise at least a kneading step, a dispersing step and, optionally, blending steps to be carried out before and/or after the kneading and dispersing steps. Any of these respective steps may be composed of two or more separate stages. Materials such as a nonmagnetic powder, a ferromagnetic powder, a binder, a carbon black, an abrasive, an antistatic agent, a lubricant, a solvent, and the like for use in the present invention may be added at any step at any time. Each material may be added at two or more steps separately. For example, polyurethane can be added dividedly at a kneading step, a dispersing step, or a blending step for adjusting viscosity after dispersion.

Various kneaders are used for kneading and dispersing a nonmagnetic coating solution and a magnetic coating solution, for example, a two-roll mill, a three-roll mill, a ball mill, a pebble mill, a trommel, a sand grinder, a Szegvari, an attriter, a high speed impeller, a high speed stone mill, a high speed impact mill, a disper, a kneader, a highspeed mixer, a homogenizer, and an ultrasonic disperser can be used.

For achieving the objects of the present invention, the above steps can be performed partly with conventionally well-known techniques. However, powerful kneading machines such as a continuous kneader or a pressure kneader are preferably used. When a continuous kneader or a pressure kneader is used, all or a part of the binder (preferably 30% by weight or more of the total binders) is kneading-treated in the range of from 15 mass parts to 500 mass parts per 100 mass parts of the ferromagnetic metal powder together with the ferromagnetic metal powder. Details of these kneading treatments are disclosed in Japanese Patent Laid-Open Nos. 106338/1989 and 79274/1989. In the present invention, by using a simultaneous multilayer coating method as disclosed in Japanese Patent Laid-Open No. 212933/1987, the production can be performed effectively.

The residual amount of the solvent in the magnetic layer of the magnetic recording medium according to the present invention is preferably 100 mg/m$^2$ or less, more preferably 10 mg/m$^2$ or less, and the residual amount of the solvent in the magnetic layer is preferably smaller than that in the nonmagnetic layer.

The void ratio is preferably 30% by capacity or less, more preferably 10% by capacity or less, with any of the lower layer and the upper layer. The void ratio in the nonmagnetic layer is preferably larger than that in the magnetic layer, but if the void ratio in the nonmagnetic layer is 5% by capacity or more, it may be smaller than that in the magnetic layer.

The magnetic recording medium according to the present invention can comprise an upper layer and a lower layer. These physical properties can be varied according to purposes in the lower layer and the upper layer. For example, the modulus of elasticity of the upper layer is made higher to improve running durability and at the same time the modulus of elasticity of the lower layer is made lower than that of the magnetic layer to improve the head touching of the magnetic recording medium.

The ferromagnetic powder in the magnetic layer thus-coated on the support is subjected to orientation according to necessity, and the magnetic layer formed is dried. If necessary, the surface smoothing treatment is performed, cut to a desired shape, thereby the magnetic recording medium according to the present invention is obtained.

The modulus of elasticity at 0.5% elongation of the magnetic layer is preferably from 100 to 2,000 kg/mm$^2$ (=about 980 to 19,600 N/mm$^2$) in the web-coating direction and the width direction, the breaking strength is preferably from 10 to 70 kg/mm$^2$ (=about 98 to 686 N/mm$^2$), the modulus of elasticity of the magnetic recording medium is preferably from 100 to 1,500 kg/mm$^2$ (=about 980 to 14,700 N/mm$^2$) in the in-plane direction, the residual elongation is preferably 0.5% or less, and the thermal shrinkage factor at every temperature of 100° C. or less is preferably 1% or less, more preferably 0.5% or less, and most preferably 0.1% or less.

The magnetic recording medium according to the present invention may be used as tapes for video use and audio use, as a floppy disc and a magnetic disc for data recording use, but is especially effectively used as a medium for digital recording use where the dropout of a signal is fatal. Further, by providing a lower nonmagnetic layer and making the thickness of a magnetic layer on the lower layer 0.25 μm or less, a high density and high capacity magnetic recording medium excellent in electromagnetic characteristics and overwriting characteristics can be obtained.

EXAMPLE

The novel characteristics of the present invention will be described in detail below with reference to specific examples,but it should not be construed as being limited thereto.

Production of Ferromagnetic Metal Powder
Sample 1
Production Process of Sample A (Goethite)

In a tank with a stirrer having a capacity of 150 liters, a mixed solution comprising 35 liters of ammonium carbonate of 1.7 mol/liter and 15 liters of aqueous ammonia of 2.0 mol/liter was bubbled with nitrogen and the temperature of the solution was maintained at 20° C., An aqueous solution (45 liters) containing ferrous sulfate, cobalt sulfate and aluminum sulfate dissolved in a different tank with bubbling with nitrogen at solution temperature of 20° C. ($Fe^{2+}$ concentration: 1.35 mol/liter, Co concentration: 0.15 mol/liter, and Al concentration: 0.04 mol/liter) was added to the above mixed solution. After stirring the solution for 10 minutes, the temperature of the suspension was raised to 25° C., and a precipitate containing ferrous iron as the main component was formed. The precipitate was ripened for 80 minutes with bubbling nitrogen. Nitrogen was replaced with air to oxidize the precipitate, thus goethite nucleus crystal was formed. When the concentration of $Fe^{2+}$ in the suspension became 0.75 mol/liter, air oxidation was discontinued and air was replaced with nitrogen, the temperature of the suspension was raised to 40° C. and maintained this temperature for 2 hours, then nitrogen was replaced with air, and the oxidation reaction was continued, thereby spindle-like goethite (Sample A) on which Al was subjected to solid-solution. The obtained particles were filtered and washed with water. Apart of Sample A was dried and photographed with a transmission electron microscope and the sizes of the particles were obtained. The average long axis length of the particles was 90 nm and the average acicular ratio was 7. The specific surface area obtained after heating and hydrating the particles at 120° C. for 30 minutes in nitrogen was 130 $m^2/g$.

Production Process of Sample A Subjected to Sintering-Preventing Treatment

The obtained goethite (Sample A) was made 2% slurry in water, an aqueous solution of cobalt sulfate (20 parts in terms of Co, the mol number was shown in part with taking the total mol number of the iron and Co in the goethite as 100 parts) and an aqueous solution of magnesium chloride (0.5 parts in terms of Mg, the mol number was shown in part with taking the total mol number of the iron and Co in the goethite as 100 parts) were added to the slurry with stirring, and the slurry was neutralized in aqueous ammonia, thereby the cobalt compound and magnesium compound were deposited on the particle surfaces. The slurry was again made a 2% slurry after being subjected to filtering and washing. An aqueous solution of aluminum sulfate (8.0 parts in terms of Al, the mol number was shown in part with taking the total mol number of the iron and Co in the goethite as 100 parts) and an aqueous solution of ferric sulfate (4.0 parts in terms of $Fe^{3+}$, the mol number was shown in part with taking the total mol number of the iron and Co in the goethite as 100 parts) were added to the slurry. After stirring for 20 minutes, diluted aqueous ammonia was added to neutralize the slurry. This product was again made a 2% slurry after filtering and washing, an aqueous solution of yttrium nitrate (6.0 parts in terms of Y, the mol number was shown in part with taking the total mol number of the iron and Co in the goethite as 100 parts) was added thereto, and the pH was adjusted to 8.5 with aqueous ammonia. The product was made a 5% slurry after filtering and washing, and the slurry was heated for 1 hour at 150° C. Thereafter, a cake obtained from the above slurry by filtering and washing was passed through molding machine and dried, thereby a spindle-like goethite subjected to sintering preventing treatment was obtained.

Reduction Treatment Process:

The above-obtained spindle-like goethite was put in a standing type kiln, heated at 300° C. for 30 minutes in nitrogen, then at 360° C. for further 30 minutes to perform dehydration, subsequently heated at 550° C. for 1 hour, and further heated at 650° C. for 2 hours, to thereby enhance the crystallizability of the hematite. The temperature was lowered to 400° C., nitrogen gas was replaced with mixed gas of 20/80 of hydrogen/nitrogen, and reduction was performed for 0.5 hours. After replacing the hydrogen/nitrogen gas with nitrogen, reduction was carried out for further 5 hours by replacing nitrogen with pure hydrogen. The reaction product was cooled with flowing hydrogen, hydrogen was replaced with nitrogen when the temperature reached 300° C., and then cooled to room temperature.

First Gradual Oxidation Process

The reaction product was put in a gradual oxidation apparatus, the mixing ratio of air and nitrogen was changed and the oxygen concentration was made 0.2%, the dew point of the gas was −45° C., and gradual oxidation was performed for 2 hours with monitoring the temperature of the metal powder. When generation of heat ceased, the oxygen concentration was made 1%, and gradual oxidation was performed for 10 hours. At this time, the temperature of the gradual oxidation apparatus was maintained at 40° C., and gradual oxidation was carried out so that the temperature of the ferromagnetic metal powder did not exceed 40° C.

Surface Treatment Process

The above-obtained ferromagnetic metal powder was cracked in $N_2$ and made a 5% slurry in water. An aqueous solution of yttrium nitrate (8.0 parts in terms of Y, the mol number was shown in part with taking the total mol number of the iron and Co in the ferromagnetic metal powder as 100 parts) was added thereto, and the pH was adjusted to 8.5 with aqueous ammonia. The slurry was heated at 150° C. for 1 hour. The product was washed with water and replaced with acetone, and the obtained cake after filtration and dehydration was passed through molding machine and then dried.

Heat Treatment Process:

The above-obtained ferromagnetic metal powder was put in a standing type kiln, heated at 300° C. for 30 minutes in nitrogen, further heat treated at 360° C. for 1 hour, and then cooled to room temperature.

Second Gradual Oxidation Process:

The ferromagnetic metal powder was put in a gradual oxidation apparatus, and distilled water was vaporized and flowed with air so that the water content of the metal powder reached 1%, thus the metal powder was humidity conditioned and stabilized, to thereby obtain a ferromagnetic metal powder (Sample 1).

Samples 2 to 5

Samples 2 to 5 were prepared in the same manner as in the preparation of Sample 1 except that each sample having the long axis length, the average acicular ratio and the specific surface area as shown in Table 1 below was used in place of Sample A, and each spindle-like goethite subjected to sintering preventing treatment was obtained. Each ferromagnetic metal powder was obtained in the same manner as in Example 1 by using the above-obtained spindle-like goethite.

TABLE 1

| Sample No. | Average Long Axis Length (nm) | Average Acicular Ratio | $S_{BET}$ ($m^2$g) |
| --- | --- | --- | --- |
| Sample 2 | 120 | 8 | 110 |
| Sample 3 | 70 | 6 | 140 |
| Sample 4 | 60 | 6 | 150 |
| Sample 5 | 40 | 4 | 190 |

Samples 6 to 9

Spindle-like goethite subjected to sintering preventing treatment each was obtained in the same manner as in the preparation of Sample 1 except that the following shown aqueous solution 1 was used to the goethite having the average long axis length of 70 nm, the average acicular ratio of 6 and the specific surface area of 140 $m^2$/g, in place of the yttrium nitrate aqueous solution used in the "Production Process in Sample A Subjected to Sintering-Preventing Treatment" of Sample 1. Using the thus-obtained spindle-like goethite, ferromagnetic metal powder was produced in the same manner as in the preparation of Sample 1 except that the following shown aqueous solution 2 was used in place of the yttrium nitrate aqueous solution used in the "Surface Treatment Process" of Sample 1.

Sample 6
Aqueous Solution 1
An aqueous solution of yttrium nitrate (6.0 parts in terms of Y, the mol number was shown in part with taking the total mol number of the iron and Co in the goethite as 100 parts)
Aqueous solution 2
An aqueous solution of aluminum sulfate (8.0 parts in terms of Al, the mol number was shown in part with taking the total mol number of the iron and Co in the ferromagnetic metal powder as 100 parts)

Sample 7
Aqueous Solution 1
An aqueous solution of lanthanum nitrate (6.0 parts in terms of La, the mol number was shown in part with taking the total mol number of the iron and Co in the goethite as 100 parts)
Aqueous solution 2
An aqueous solution of lanthanum nitrate (8.0 parts in terms of La, the mol number was shown in part with taking the total mol number of the iron and Co in the ferromagnetic metal powder as 100 parts)

Sample 8
Aqueous Solution 1
An aqueous solution of gadolinium nitrate (6.0 parts in terms of Gd, the mol number was shown in part with taking the total mol number of the iron and Co in the goethite as 100 parts)
Aqueous Solution 2
An aqueous solution of gadolinium nitrate (8.0 parts in terms of Gd, the mol number was shown in part with taking the total mol number of the iron and Co in the ferromagnetic metal powder as 100 parts)

Sample 9
Aqueous Solution 1
An aqueous solution of zirconium nitrate (6.0 parts in terms of Zr, the mol number was shown in part with taking the total mol number of the iron and Co in the goethite as 100 parts)
Aqueous Solution 2
An aqueous solution of zirconium nitrate (8.0 parts in terms of Zr, the mol number was shown in part with taking the total mol number of the iron and Co in the ferromagnetic metal powder as 100 parts)

Sample 10
Formation of Nucleus Crystal

Into a closable glass container having a capacity of 2 liters containing 500 ml of an aqueous solution of $FeCl_3$ of 2 mol/liter, 500 ml of an aqueous solution of NaOH of 5.94 mol/liter was added with stirring for 5 minutes, stirring was continued further 20 minutes after termination of addition, and then the container was completely closed.

The container was placed in an oven previously heated to 100° C., and allowed to stand in the oven for 72 hours. Seventy-two hours after, the reaction solution was suddenly cooled with flowing water, the reaction solution was dispensed and centrifuged in a centrifugal separator at 15,000 rpm for 15 minutes, and the supernatant was discarded. Distilled water was added to the obtained product and the system was redispersed, centrifuged again and the supernatant was discarded. This washing was repeated three times using the centrifugal separator. The precipitate of the hematite particles thus-undergone washing (average long axis length: about 80 nm) was dried. Distilled water (5 ml) was added to 50 g of the dried powder, and the powder was cracked in a cracker for 30 minutes. The powder was washed out to a beaker with 500 ml of distilled water, divided to 100 ml, put in a 200 ml mayonnaise bottle containing steel beads, and dispersed for 10 hours. The dispersion was gathered, the mayonnaise bottle was washed with distilled water, and the dispersion was recovered. Distilled water was added to the dispersion to make the total amount of the liquid 1,200 ml, and the dispersion was subjected to ultrasonic dispersion for further 30 minutes. The dispersion was dispensed and centrifuged at 10,000 rpm for 30 minutes, the supernatant containing ultra-fine particles of hematite (average particle size: about 70 angstroms) dispersed therein was taken out of the centrifugal separator, thus nucleus crystal was obtained. The concentration of iron in the nucleus crystal solution was 2,000 ppm.

Control of Crystallite Size of Monodispersed Spindle-type Hematite

Ferric nitrate (180 ml) of 1 mol/liter was put in a reaction vessel with a stirrer, and the solution was cooled to 5° C. A sodium hydroxide solution (180 ml) of 2.4 mol/liter was added thereto with stirring over 5 minutes. After the addition, the reaction solution was further stirred for 5 minutes, 180 ml of the nucleus solution was added thereto and the solution was stirred for 10 minutes. The obtained solution was taken by 60 ml each, 10 ml of $NaH_2PO_4$ of 0.048 mol/liter was added thereto as the configuration-controlling ion, and then 10 ml of $H_2O$ was added, and the reaction vessel was tightly sealed. The vessel was placed in an oven previously heated to 120° C., and allowed to stand in the oven for 72 hours. The reaction solution was quenched with flowing water, the reaction solution was centrifuged in a centrifugal separator at 18,000 rpm for 15 minutes, and the supernatant was discarded. Distilled water was added to the obtained product and the system was redispersed, centrifuged again and the supernatant was discarded. This washing was repeated three times using the centrifugal separator. In the next place, aqueous ammonia of 1 mol/liter was added thereto and the reaction system was dispersed again, centrifuged again, and the supernatant was discarded. This washing was repeated three times using the centrifugal separator. A part of the produce was taken, and the dried particles were observed with a transmission electron microscope. The obtained particles were $\alpha$-$Fe_2O_3$ particles having an average long axis length of 70 nm, an average acicular ratio of 5.0, a variation coefficient of the long axis length (100×standard deviation of long axis length/average long axis length) of 7%, and excellent particle size distribution.

The obtained monodispersed spindle-like hematite was dispersed so that hematite concentration reached 2% in distilled water, and cobalt sulfate was added to the slurry with stirring thoroughly so that Co reached 10 atomic % with Fe in the hematite as 100 atomic %. Aqueous ammonia was added to the suspension with stirring the suspension and monitoring the pH to adjust pH to 8.5, and the Co compound was adhered on the surface of the hematite. The suspension was filtered, washed and dispersed so that the concentration of hematite reached 2%, and an aqueous solution of aluminum sulfate (Al was 8 atomic % with Fe in the hematite as 100 atomic %) and an aqueous solution of ferric sulfate ($Fe^{3+}$ was 4 atomic % with Fe in the hematite as 100 atomic %) were added to the suspension with stirring the suspension, and diluted aqueous ammonia was added thereto to adjust pH to 8.5. With stirring the suspension so that Y reached 6 atomic % with Fe in the hematite as 100 atomic %, a yttrium nitrate solution was added to the suspension, and aqueous ammonia was added to adjust pH to 8.5. Impurities were removed by filtering the suspension and washing with distilled water. The obtained surface-treated spindle-like hematite was passed through molded plate having a diameter of 3 mm and molded in a cylindrical form and dried.

The surface-treated monodispersed spindle-like hematite (500 g) was placed in a standing type reducing furnace and heated in nitrogen at 350° C. for 30 minutes, and then annealed at 650° C. for 2 hours. Then, the temperature was lowered to 350° C., nitrogen gas was replaced with mixed gas of 20/80 of hydrogen/nitrogen, and reduction was performed for 1 hour. After replacing the hydrogen/nitrogen gas with nitrogen, the temperature was raised to 475° C., and the reduction was carried out for further 5 hours by replacing nitrogen with pure hydrogen. The reaction product was cooled in hydrogen to 300° C., and then hydrogen was replaced with nitrogen and cooled to the room temperature. The reaction product was put in a gradual oxidation apparatus, the mixing ratio of air and nitrogen was changed and the oxygen concentration was made 0.2%, and gradual oxidation was performed with monitoring the temperature of the metal powder so as not to exceed 45° C. Gradual oxidation of the hematite was performed for 10 hours with the temperature of the gradual oxidation apparatus of 45° C. and the oxygen concentration of 1%, thus a ferromagnetic metal powder was obtained. The obtained ferromagnetic metal powder was cracked in $N_2$ and made a 5% slurry in water. An aqueous solution of yttrium nitrate (8.0 parts in terms of Y, the mol number was shown in part with taking the total mol number of the iron and Co in the ferromagnetic metal powder as 100 parts) was added thereto, and the pH was adjusted to 8.5 with aqueous ammonia. The slurry was heated at 150° C. for 1 hour. The product was washed with water and replaced with acetone, and the obtained cake after filtration and dehydration was passed through molding machine and then dried. The obtained ferromagnetic metal powder was put in a standing type kiln, heated at 300° C. for 30 minutes in nitrogen, further heat treated at 360° C. for 1 hour, and then cooled to room temperature. The ferromagnetic metal powder was put in a gradual oxidation apparatus, and distilled water was vaporized and flowed with air so that the water content of the metal powder reached 1%, thus the metal powder was humidity conditioned and stabilized, to thereby obtain a ferromagnetic metal powder (Sample 10).

Sample 11

A ferromagnetic metal powder (Sample 11) was produced in the same manner as in the preparation of Sample 10 except that sodium tungstate (W was 5 atomic % with Fe in the hematite as 100 atomic %) and sodium tungstate (W was 5 atomic % with Fe in the ferromagnetic metal powder as 100 atomic %) were used in place of yttrium nitrate used in Sample 10.

Samples 12 and 13

The spindle-like goethite having been subjected to sintering preventing treatment used in Samples 3 and 4 was placed in a standing type reducing furnace and heated in nitrogen at 350° C. for 60 minutes, dehydrated, the temperature was raised to 450° C., and the reduction was carried out for 6 hours by replacing nitrogen with pure hydrogen. Then, the reaction system was cooled with flowing hydrogen, and hydrogen was replaced with nitrogen when the temperature reached 300° C. The reaction product was placed in a gradual oxidation apparatus, the mixing ratio of air and nitrogen was changed and the oxygen concentration was made 0.2%, the dew point of the gas was −45° C., and gradual oxidation was performed at 40° C. or less for 2 hours with monitoring the temperature of the metal powder. When generation of heat ceased, the oxygen concentration was made 1%, and gradual oxidation was performed for 10 hours. At this time, the temperature of the gradual oxidation apparatus was maintained at 45° C., and gradual oxidation was carried out so that the temperature of the ferromagnetic metal powder did not exceed 45° C. Hereafter, distilled water was vaporized and flowed with air so that the water content of the metal powder reached 1%, without being subjected to the surface treatment process and the heat treatment process as in Sample 1, thus the metal powder was humidity conditioned and stabilized, to thereby obtain a ferromagnetic metal powder (Samples 12 and 13).

Sample 14

The gradual oxidation conditions of the first gradual oxidation treatment process of the dehydrated and reduction-treated metal powder similarly to Sample 3 were changed as follows. The reaction product was placed in a gradual oxidation apparatus, the mixing ratio of air and nitrogen was changed and the oxygen concentration was made 0.2%, the dew point of the gas was −45° C., and gradual oxidation was performed at 40° C. or less for 2 hours with monitoring the temperature of the metal powder. When generation of heat ceased, the oxygen concentration was made 1%, and gradual oxidation was performed for 10 hours. At this time, the temperature of the gradual oxidation apparatus was maintained at 50° C., and gradual oxidation was carried out so that the temperature of the ferromagnetic metal powder did not exceed 50° C. Hereafter, distilled water was vaporized and flowed with air so that the water content of the metal powder reached 1%, without subjecting to the surface treatment process and heat treatment process, thus the metal powder was humidity conditioned and stabilized, to thereby obtain a ferromagnetic metal powder (Sample 14).

Sample 15

A ferromagnetic metal powder (Sample 15) was produced in the same manner as in production of Sample 1 except that a sample having an average long axis length of 90 nm, an average acicular ratio of 5, and a specific surface area of 110 $m^2/g$ was used in place of Sample A. In the producing method of Sample 1, the sample was not subjected to the surface treatment process and the heat treatment process.

The magnetic characteristics of each ferromagnetic metal powder were measured using a vibrating sample magnetometer (a product of Toei Kogyo Co., Ltd.) by an external magnetic field at 10 kOe. The average long axis length and the average oxide layer thickness of each sample were obtained from the high resolution transmission electron microphotographs of 300 particles of the obtained ferromagnetic metal powder.

The crystallite size of each sample was obtained by an X-ray diffractometer by the following method.

The crystallite size was obtained from the sweep of the half value width of the diffraction line of (110) plane and (220) plane corresponding to α-Fe by X-ray diffraction (50 kV–150 mA: CuK β ray).

Magnetic characteristics was measured by a vibrating sample magnetometer VSM-5 (a product of Toei Kogyo Co., Ltd.), time constant of 0.1 second, sweep speed of 3 second/10 kOe, and the measuring magnetic field at 10 kOe.

The magnetic characteristics of the ferromagnetic metal powder Samples 1 to 15 are shown in Tables 2 and 3 below.

TABLE 2

| | Sample No. | | | | | | | |
|---|---|---|---|---|---|---|---|---|
| | Sample 1 Invention | Sample 2 Comparative | Sample 3 Invention | Sample 4 Invention | Sample 5 Comparative | Sample 6 Invention | Sample 7 Invention | Sample 8 Invention |
| σs (A · m²/kg) | 125 | 128 | 120 | 115 | 102 | 128 | 110 | 90 |
| Hc (kA/m) | 175.5 | 191.2 | 183.0 | 166.4 | 156.5 | 188.7 | 189.5 | 190.2 |
| Average long axis length (nm) | 64 | 80 | 50 | 39 | 28 | 52 | 48 | 47 |
| Average oxide layer thickness (nm) | 2.4 | 2.5 | 2.3 | 2.3 | 2.4 | 2.4 | 2.3 | 2.2 |
| Crystallite size (angstroms) | 120 | 122 | 113 | 85 | 80 | 115 | 115 | 118 |

TABLE 3

| | Sample No. | | | | | | |
|---|---|---|---|---|---|---|---|
| | Sample 9 Invention | Sample 10 Invention | Sample 11 Invention | Sample 12 Comparative | Sample 13 Comparative | Sample 14 Comparative | Sample 15 Comparative |
| σs (A · m²/kg) | 117 | 110 | 80 | 110 | 81 | 90 | 126 |
| Hc (kA/m) | 186.5 | 165.9 | 164.3 | 183.0 | 178.7 | 175.6 | 179.4 |
| Average long axis length (nm) | 49 | 56 | 54 | 55 | 44 | 57 | 65 |
| Average oxide layer thickness (nm) | 2.3 | 2.3 | 2.2 | 2.7 | 2.8 | 2.9 | 2.4 |
| Crystallite size (angstroms) | 115 | 112 | 120 | 110 | 100 | 98 | 152 |

Manufacture of Magnetic Recording Medium:

Examples 1 to 11 And Comparative Examples 1 to 7

For manufacturing a magnetic tape having multilayer structure in which each of the above ferromagnetic metal powders were used, the following magnetic layer composition, lower nonmagnetic layer composition and backing layer composition were prepared.

| Composition of Magnetic Layer | |
|---|---|
| Ferromagnetic metal powder (Samples 1 to 15) | 100 parts |
| Binder resin | |
|    Vinyl chloride polymer | 13 parts |
|    an –SO₃Na group content: 1 × 10⁻⁴ | |
|    eq/g, polymerization degree: 300 | |
|    Polyester polyurethane resin | 5 parts |
|    (neopentyl glycol/caprolactone polyol/ | |
|    MDI = 0.9/2.6/1 | |
|    an —SO₃Na group content: 1 × 10⁻⁴ | |
|    eq/g | |
| α-Alumina (average particle size: 0.13 μm) | 4 parts |
| Carbon black | 1 part |
| average particle diameter: 50 nm | |
| Phenylphosphonic acid | 3 parts |
| Butyl stearate | 3 parts |
| Stearic acid | 3 parts |
| Mixed solvent of methyl ethyl ketone and cyclohexanone (1/1) | 360 parts |

| Composition of Lower Nonmagnetic Layer | |
|---|---|
| Acicular hematite | 80 parts |
| S_BET: 55 m²/g, | |
| average long axis length: 0.10 μm, | |
| average acicular ratio: 7, pH: 8.8, | |
| surface-covering compound: Al₂O₃, | |
| 1 mass % (i.e., weight %) | |
| Carbon black | 20 parts |
| average primary particle size: 17 nm, | |
| DBP oil absorption: 80 ml/100 g, | |
| S_BET: 240 m²/g, pH: 7.5 | |
| Binder resin | |
|    Vinyl chloride polymer | 12 parts |
|    an —SO₃Na group content: 1 × 10⁻⁴ | |
|    eq/g, polymerization degree: 300 | |
|    Polyester polyurethane resin | 5 parts |
|    (neopentyl glycol/caprolactone polyol/ | |
|    MDI = 0.9/2.6/1 (molar ratio), | |
|    an –SO₃Na group content: 1 × 10⁻⁴ | |
|    eq/g | |
| Phenylphosphonic acid | 3 parts |
| Butyl stearate | 3 parts |
| Stearic acid | 3 parts |
| Mixed solvent of methyl ethyl ketone and cyclohexanone (1/1) | 280 parts |

| Composition of Backing Layer | |
|---|---|
| Fine carbon black powder | 100 parts |
| BP-800 (average particle size: 17 nm, | |
| manufactured by Cabot Co., Ltd.) | |

-continued

| | |
|---|---|
| Coarse carbon black powder<br>Thermal Black (average particle size: 270 nm,<br>manufactured by Cancarb Co., Ltd.) | 3 parts |
| α-Alumina (hard inorganic powder)<br>(dispersion of HIT55/MR110/MEK =<br>5/1/4 (parts) was used,<br>in the dispersion, α-alumina (HIT55)<br>was 0.5 parts) | 0.5 parts |
| Nitrocellulose resin | 108 parts |
| Polyurethane resin | 15 parts |
| Polyisocyanate | 40 parts |
| Polyester resin | 5 parts |
| Dispersant: | |
| Copper oleate | 4 parts |
| Copper phthalocyanine | 4 parts |
| Barium sulfate | 5 parts |
| Methyl ethyl ketone | 2,200 parts |
| Butyl acetate | 300 parts |
| Toluene | 600 parts |

With each of the above compositions of the coating solution for the magnetic layer (for upper layer) and the nonmagnetic layer (for lower layer), pigment, vinyl chloride polymer, phenylphosphonic acid and 50% of the prescribed amount of each solvent were blended in a kneader, then polyurethane resin and the remaining components were added and dispersed with a sand mill, and dispersion solutions for the magnetic layer and the nonmagnetic layer were prepared. To each solution were added 5 parts of polyisocyanate and 30 parts of cyclohexanone and final dispersion was performed. The resulting dispersion solution was filtered through a filter having an average pore diameter of 1 μm, and the magnetic layer coating solution and nonmagnetic layer coating solution was obtained. The above compositions of the coating solution for the backing layer were blended in a continuous kneader, then dispersed with a sand mill. The resulting dispersion solution was filtered through a filter having an average pore diameter of 1 μm to obtain a coating solution for forming the backing layer.

These coating solutions were simultaneously multilayer-coated on an aramid support (trade name: Mictron) having a thickness of 3.7 μm and a central plane average surface roughness of 2 nm of the surface side on which a magnetic layer was to be coated. The nonmagnetic layer coating solution was coated in a dry thickness of 1.0 μm, and immediately thereafter the magnetic layer coating solution was coated on the nonmagnetic layer in a dry thickness of 0.15 μm (0.08 to 0.30 μm). The coated layers were oriented with a cobalt magnet having a magnetic force of 477.5 kA/m and a solenoid having a magnetic force of 477.5 kA/m while both layers were still wet.

After drying, the coated layer was subjected to calendering treatment with a calender of 7 stages comprising metal rolls and plastic rolls at 85° C. at a velocity of 200 m/min, and a linear pressure of 2,940 N/cm. Thereafter, a backing layer coating solution was coated to form a backing layer having a thickness of 0.5 μm. The obtained web was slit to a desired width (8 mm, ¼ inches, ½ inches, or 3.8 mm). The magnetic layer surface of the thus-produced tape was cleaned with a tape cleaning apparatus having a delivery and a winding-up movement of a slit product to which a nonwoven fabric and an abrasive tape were attached so as to be pressed against the magnetic layer surface of the tape, thus a tape sample was obtained.

SFDr, surface roughness, electromagnetic characteristics, durability, and weather fastness of the magnetic layer of each of the obtained samples were measured from the magnetic characteristics measured with a vibrating sample magnetometer and from Remanence curve.

Electromagnetic characteristics were measured as follows.

An MIG head (head gap: 0.2 μm, track width: 17 μm, saturation magnetic flux density: 1.5 T, azimuth angle: 20°) and an MR head for reproduction (SAL bias, MR element was Fe—Ni, track width: 6 μm, gap length: 0.2 μm, azimuth angle: 20°) were mounted on an 8 mm deck for data recording. Optimal electric current for recording was determined by the MIG head from input-output behavioral characteristics of ½ Tb (lambda=0.5 μm) with the relative velocity of the tape and the head as 10.2 m/sec, and signal was recorded by this electric current and reproduced by the MR head.

C/N was from the peak of reproduction carrier to erasure noise, and resolution band width of spectrum analyzer was made 100 kHz. C/N was represented with the tape in Example 1 as standard.

Magnetic characteristics were measured using a vibrating sample magnetometer (a product of Toei Kogyo Co., Ltd.) by an external magnetic field at 796 kA/m in parallel to the orientation direction.

Remanence curve and SFDr were measured as follows.

A magnetic recording medium sample to be measured was set on the vibrating sample magnetometer so that the orientation direction of the sample coincided with the direction of the magnetic field. Remanence curve was measured by repeating the procedure of applying −797 kA/m, saturation by DC, returning the magnetic field to zero, measuring the residual magnetization (-Mrmax), applying the magnetic field of 7.96 kA/m in the inverse direction, returning the magnetic field to zero, measuring the residual magnetization Mr, varying the applied magnetic field by 7.96 kA/m, and measuring the residual magnetization. SFDr was obtained from (the half value width of the peak on the differential curve of Remanence curve)/(peak of magnetic field).

A sample having a thickness of about 0.1 μm was cut out with a diamond cutter in the machine direction of the magnetic medium, observed with a transmission electron microscope of 30,000 magnifications and photographed. The print size of the photograph was from A4 size (i.e., 297×210 mm). The present inventors paid attentions to the difference of the figures of the ferromagnetic powders and the nonmagnetic powders of the magnetic layer and the nonmagnetic layer and rimmed the interface and the surface of the magnetic layer with black by visual judgement. Thereafter, the distance between the rimmed lines was measured by the image analyzer KS4000 (manufactured by Carl Zweiss Co., Ltd.). The length of the sample photograph covered 21 cm, and the measurement was carried out by dotting the measuring points. The value obtained by dividing the simple add mean by the magnification was taken as the thickness of the magnetic layer.

Central plane average surface roughness (Ra) of the area of about 184 μm×242 μm of a magnetic layer surface was measured using a light interference type three dimensional roughness meter "HD-2000" (a product of WYKO, Arizona, U.S.A.) by 3D-MIRAU method. Inclination compensation and cylindrical compensation were applied with an objective lens of 50 magnifications and a middle lens of 0.5 magnifications. This is a non-contact surface roughness meter of performing measurement by light interference.

The measurement of the weather fastness of the magnetic layer ΔΦm (%) was performed by the above-described method.

Regarding durability, prescribed signals were recorded using a DDS drive and the tape of 1 minute length was run 2,000 passes at 25° C. 10% RH with monitoring the reproduced signals. A tape that reduced in output by 3 dB from the initial output was stopped its run at that point of time. A sample that ran 2,000 passes was observed of stains around the head. Evaluation of the stain was such that a tape caused no stain or stain was observed but little was graded o, one caused stains (middling) was graded Δ, and one caused considerable stains was graded x.

The magnetic characteristics of the obtained magnetic recording medium (tape) are shown in Tables 4 and 5 below.

TABLE 4

| | Example No. | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| | Magnetic powder used | | | | | | | | |
| | Sample 1 | Sample 3 | Sample 4 | Sample 6 | Sample 7 | Sample 8 | Sample 8 | Sample 8 | Sample 9 |
| Magnetic characteristics | | | | | | | | | |
| Hc (kA/m) | 188.5 | 194.5 | 180.1 | 195.7 | 202.9 | 208.2 | 207.1 | 205.7 | 198.9 |
| SQ | 0.90 | 0.88 | 0.86 | 0.89 | 0.88 | 0.90 | 0.89 | 0.88 | 0.88 |
| Φr (mT × μm) | 45.9 | 43.6 | 40.0 | 46.7 | 39.6 | 18.4 | 33.4 | 48.4 | 42.2 |
| SFDr | 0.305 | 0.344 | 0.407 | 0.340 | 0.353 | 0.345 | 0.369 | 0.386 | 0.360 |
| Magnetic layer thickness (μm) | 0.15 | 0.15 | 0.15 | 0.15 | 0.15 | 0.08 | 0.15 | 0.22 | 0.15 |
| Weather-fastness (Δφm) (%) | 6.0 | 7.5 | 8.2 | 3.2 | 4.7 | 1.2 | 1.0 | 0.8 | 4.8 |
| Durability | | | | | | | | | |
| Pass number | 2,000 | 2,000 | 2,000 | 2,000 | 2,000 | 2,000 | 2,000 | 2,000 | 2,000 |
| Staining of head | o | o | o | o | o | o | o | o | o |
| Surface roughness (Ra) (nm) | 2.2 | 2.0 | 1.8 | 2.2 | 1.9 | 1.9 | 2.0 | 2.1 | 2.2 |
| Electromagnetic characteristics | | | | | | | | | |
| Output (dB) | 0.0 | 0.5 | −0.7 | 0.2 | 1.2 | 1.8 | 2.0 | 2.5 | 1.1 |
| C/N (dB) | 0.0 | 1.2 | 2.6 | 0.5 | 2.1 | 4.1 | 4.0 | 4.2 | 1.2 |

TABLE 5

| | Example No. | | | | | | | | |
|---|---|---|---|---|---|---|---|---|---|
| | Ex. 10 | Ex. 11 | Comp. Ex. 1 | Comp. Ex. 2 | Comp. Ex. 3 | Comp. Ex. 4 | Comp. Ex. 5 | Comp. Ex. 6 | Comp. Ex. 7 |
| | Magnetic powder used | | | | | | | | |
| | Sample 10 | Sample 11 | Sample 2 | Sample 5 | Sample 8 | Sample 12 | Sample 13 | Sample 14 | Sample 15 |
| Magnetic characteris-tics | | | | | | | | | |
| Hc (kA/m) | 157.8 | 180.7 | 210.6 | 170.3 | 200.5 | 196.5 | 196.4 | 194.9 | 192.4 |
| SQ | 0.86 | 0.86 | 0.92 | 0.77 | 0.86 | 0.86 | 0.85 | 0.86 | 0.84 |
| Φr (mTxμm) | 38.7 | 33.2 | 48.3 | 32.3 | 64.2 | 38.7 | 28.2 | 32.3 | 42.9 |
| SFDr | 0.334 | 0.349 | 0.295 | 0.747 | 0.452 | 0.536 | 0.606 | 0.569 | 0.354 |
| Magnetic layer thickness (μm) | 0.15 | 0.15 | 0.15 | 0.15 | 0.30 | 0.15 | 0.15 | 0.15 | 0.15 |
| Weather-fastness (Δφm) (%) | 3.9 | 0.8 | 6.6 | 10.2 | 0.7 | 12.1 | 4.5 | 5.5 | 7.9 |
| Durability | | | | | | | | | |
| Pass number | 2,000 | 2,000 | 2,000 | 1,200 | 2,000 | 2,000 | 2,000 | 2,000 | 2,000 |
| Staining of head | o | o | o | x | x | Δ | o | Δ | o |
| Surface roughness (Ra) (nm) | 1.8 | 1.7 | 3.2 | 1.8 | 2.4 | 2.3 | 2.2 | 2.2 | 2.3 |
| Electro-magnetic characteris-tics | | | | | | | | | |
| Output (dB) | 0.1 | 0.3 | 1.5 | −3.3 | 2.2 | −0.3 | −2.2 | −1.9 | −1.2 |
| C/N (dB) | 2.0 | 2.3 | −2.9 | −0.2 | 2.8 | −0.5 | −1.8 | −1.5 | −3.5 |

It can be seen from the results in Tables 4 and 5 that a magnetic recording medium obtained by using a ferromagnetic metal powder having an average long axis length of a particle of from 30 to 65 nm, a crystallite size of from 80 to 130 angstroms, an average oxide layer thickness controlled to 2.5 nm or less, and as of from 75 to 130 A·m²/kg to suppress the magnetic layer thickness in the range of from 0.04 to 0.25 μm is excellent such that the demagnetization of the magnetic layer after storage at 60° C. 90% RH for one week is 10% or less, the magnetic layer surface is smooth, excellent in SFDr, although the particle is fine and as is low, and stable in durability. Further, the magnetic recording medium is excellent in electromagnetic characteristics, e.g., output and C/N. It has also been found that such a ferromagnetic metal powder can be obtained by dispersing a ferromagnetic powder obtained by reduction in a gaseous phase, adhering at least one element selected from Al, Y, lanthanoid, Zr and W to the ferromagnetic powder in water, performing heat treatment, and again performing gradual oxidation treatment.

EFFECT OF THE INVENTION

A magnetic recording medium according to the present invention has a magnetic layer thickness of from 0.04 to 0.25 μm when manufactured with a ferromagnetic metal powder having an average long axis length of a particle of from 30 to 65 nm, a crystallite size of from 80 to 130 angstroms, $\sigma s$ of from 75 to 130 A·m²/kg, and an average oxide layer thickness of from 2.6 to 3.1 nm, and is excellent in storage stability such that the demagnetization after storage at 60° C. 90% RH for one week is 10% or less, in surface smoothness, in SFDr, in electromagnetic characteristics, e.g., output and C/N, and further stable in durability. Accordingly, the present invention can provide a magnetic recording medium suitable for a system mounting a magneto-resistance type (MR) head as a reproducing head.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A method of producing a ferromagnetic metal powder having an average long axis length of from 30 to 65 nm, a crystallite size of from 80 to 130 angstroms, a saturation magnetization ($\sigma s$) of from 75 to 130 A·m²/kg, and an average oxide layer thickness of from 1.5 to 2.5 nm, the method comprising:
  reducing the oxide of a ferromagnetic metal element to obtain the ferromagnetic metal powder,
  subjecting the ferromagnetic metal powder obtained by reducing the ferromagnetic metal element to gradual oxidation treatment to make $\sigma s$ 120 to 150 A·m²/kg,
  adhering, in water, at least one element selected from Al, Y, lanthanoid, Zr and W to the oxidized ferromagnetic metal powder obtained from the gradual oxidation treatment,
  performing heat treatment, and
  again performing the gradual oxidation treatment.

2. The method of producing the ferromagnetic metal powder as in claim 1, wherein the ferromagnetic metal powder is a ferromagnetic metal powder comprising a metallic part and an oxide layer present around the metallic part and havin the variation coefficient of a long axis length of 25% or less, an average acicular ratio of from 3 to 9, and a coercive force (Hc) of from 135 to 320 kA/m.

3. The method of producing the ferromagnetic powder as in claim 1, wherein the metallic part of the ferromagnetic metal powder mainly comprises Fe or Fe—Co, and the Co content is from 8 to 45 weight % based on Fe contained in the ferromagnetic metal powder.

4. The method of producing the ferromagnetic metal powder as in claim 1, wherein the oxide layer of the ferromagnetic metal powder contains at least one element selected from the group consisting of Al, Co, Y, lanthanoid, Zr and W.

5. The method of producing the ferromagnetic metal powder as in claim 1, wherein the magnetic recording medium has a residual magnetic flux ($\Phi r$) of from 5 to 75 mT·μm.

6. The method of producing the ferromagnetic metal powder as in claim 1, wherein the magnetic recording medium further has a nonmagnetic layer mainly comprising a nonmagnetic powder and a binder resin between the support an the magnetic layer, and the magnetic layer has a central plane average surface roughness 3.0 nm or less.

* * * * *